(12) United States Patent
Kawase

(10) Patent No.: US 6,848,061 B2
(45) Date of Patent: Jan. 25, 2005

(54) DRIVE MECHANISM CONTROL DEVICE AND METHOD, DRIVING OPERATION CONFIRMATION METHOD FOR A DRIVE MECHANISM, AND PROGRAMS FOR IMPLEMENTING THE METHODS

(75) Inventor: Yuji Kawase, Matsumato (JP)

(73) Assignee: Seiko Epson Corporation, Tokyo (JP)

( * ) Notice: Subject to any disclaimer, the term of this patent is extended or adjusted under 35 U.S.C. 154(b) by 685 days.

(21) Appl. No.: 09/835,029

(22) Filed: Apr. 12, 2001

(65) Prior Publication Data

US 2001/0049754 A1 Dec. 6, 2001

(30) Foreign Application Priority Data

May 12, 2000 (JP) ........................................ 2000-140541
May 29, 2000 (JP) ........................................ 2000-158348

(51) Int. Cl.[7] .............................................. G08F 1/04
(52) U.S. Cl. ........................ 713/600; 713/400; 710/22
(58) Field of Search ................................. 713/400, 600; 710/22, 25, 26; 318/696, 115; 347/144, 177

(56) References Cited

U.S. PATENT DOCUMENTS

| 4,545,014 A | * | 10/1985 | Oguchi | ........................ 710/22 |
| 5,140,340 A | * | 8/1992 | Stephenson | .................. 347/177 |
| 5,518,324 A | * | 5/1996 | Campbell et al. | .............. 400/56 |
| 5,583,410 A | | 12/1996 | Jacobson et al. | |
| 5,703,454 A | | 12/1997 | Taguchi | |
| 5,998,955 A | | 12/1999 | Nishioka | |
| 6,075,336 A | * | 6/2000 | Sugai et al. | ................. 318/696 |

FOREIGN PATENT DOCUMENTS

| EP | 0 773 488 | 5/1997 |
| GB | 2 136 332 | 9/1984 |
| JP | 06032018 | 2/1994 |
| JP | 06-113595 | 4/1994 |

* cited by examiner

*Primary Examiner*—Lynne H. Browne
*Assistant Examiner*—Thuan Du
(74) *Attorney, Agent, or Firm*—Michael T. Gabrik

(57) ABSTRACT

A stepping motor, head, or other drive mechanism is driven with high precision without using a high speed CPU or dedicated hardware. Timing data controlling the timing at which drive mechanism operation changes, and plural control data controlling drive mechanism operation at each timing change, are stored to memory. After a drive command from the CPU is received, timing data is read from memory by a direct memory access (DMA), and sent to a timer. Based on a time-up signal from the timer, the drive control data is read sequentially from memory by DMA for each of plural control data types and sent to a drive control unit. Afterward, the next timing data is sent to the timer and the operation repeated. The drive control unit drives the drive mechanism based on the control data.

46 Claims, 18 Drawing Sheets

DRIVE MECHANISM CONTROL DEVICE AND METHOD, DRIVING OPERATION CONFIRMATION METHOD FOR A DRIVE MECHANISM, AND PROGRAMS FOR IMPLEMENTING THE METHODS

BACKGROUND OF THE INVENTION

1. Field of the Invention

The present invention relates to a drive mechanism requiring accurate and precise operation, to control methods for the drive mechanism, and to programs for implementing the methods. More particularly, this invention relates to a control device, methods and programs for driving precisely and at high speed a drive mechanism, such as those used in modern electronic devices, corresponding control methods.

2. Description of the Related Art

Extremely high speed, precise operation is necessary in the drive mechanisms for many modern electronic devices. In printers, for example, this has meant using stepping motors or linear motors for driving the paper transport mechanism and carriage mechanism. In order to print the desired text or graphic in the correct position, it is also necessary to drive the print head (print operation) quickly and precisely according to the movement of the carriage and print medium (paper).

Conventional drive mechanism control technology includes CPU interrupt signal control methods and control methods using dedicated hardware. Fast, precise drive control of a print head drive mechanism by these conventional methods is further described below, by way of example, using drive control with a stepping motor (referred to as simply a "motor" below). Note that similar drive control is also needed for other mechanisms. The phase pattern of current applied to the motor at the phase change timing must be changed, and the amount of current flowing to the motor may also need to be changed, as part of motor drive control. Control during motor acceleration and deceleration is particularly complex because the phase change timing must be sequentially changed while at the same time sequentially changing the amount of current supplied to the motor according to the specific acceleration or deceleration conditions.

Control with dedicated hardware uses special dedicated hardware to control motor phase change and current supply. However, while using dedicated hardware offers the advantage of high precision drive control, the cost of providing such dedicated hardware is generally high. Other disadvantages of using dedicated hardware are longer development time and the inability to flexibly and easily change the control method.

In CPU-based interrupt control methods the CPU runs an interrupt process at a specific timing to read from memory control data for changing the phase pattern of current applied to the motor or controlling the amount of current flowing to the motor, and supply this control data to a drive controller. This method makes it possible to shorten product development time and flexibly change the control operation, while also helping to minimize development and product costs. CPU interrupt control methods are therefore widely used in the development of modern electronics because of their ability to shorten development time and accommodate fast changes in design requirements.

The CPU interrupt control process can ensure precise drive control according to the control data sent from the CPU as long as the drive device ("driver" below) is operating. However, various errors and problem factors can prevent the driver from operating according to the drive control data. In the carriage drive mechanism of a print head, for example, the carriage mechanism can be prevented from moving by an obstruction, such as a paper jam, in the carriage path. Under such circumstances changing the phase pattern or current supply from the controller will not cause the motor to turn because the carriage cannot move. When this happens the expected carriage position (that is, the position where the carriage should be or logical operating position) computed by the controller from the control data differs from the position where the carriage is actually present (the "current operating position"), and carriage drive cannot be precisely controlled.

An appropriate process must therefore be executed to handle such problems. In the print head carriage drive mechanism, for example, sensors regularly detect the actual carriage position to confirm if the carriage is being driven correctly. Operation is confirmed by CPU control causing the carriage to move regularly (such as every 6 seconds) to a specific sensor position (such as the home position) to detect the physical carriage position, compare this actual carriage position with the computed logical position, and detect any offset therebetween.

This position confirmation is also accomplished by a CPU interrupt process reading drive control data from memory to drive the motor and move the carriage to the home position. Drive control accuracy is confirmed from the logical carriage position computed from the control data, and the offset from the actual carriage position detected at the home position.

A conventional drive operation confirmation process using a CPU is described below with reference to FIG. 18. CPU 1 reads motor drive control data from a control data table stored to memory 2 at the phase change timing, and sends the control data to motor drive controller 24. The motor drive controller 24 drives motor driver 74 based on the control data, and thus causes motor 25 to turn. When the motor 25 turns, carriage 73 moves side to side through the carriage path by way of a power transfer mechanism 71. Simultaneously to sending the control data, CPU 1 computes the motor drive from the control data and determines from the computed motor drive the logical current position of carriage 73. A photosensor or other detector 72 is disposed at the home position in the path of carriage 73 movement. When the carriage 73 moves to the home position, detection circuit 75 detects the carriage presence. When the detection circuit 75 detects that the carriage 73 is in the home position, it sends an interrupt signal (home position (HP) detection signal in this case) to the CPU 1. When CPU 1 receives this interrupt signal it compares the logical carriage position with the home position to determine whether the carriage 73 is being driven normally. If the computed position is greatly offset from the carriage position at the home position, CPU 1 knows that carriage 73 drive is not normal and runs a particular error handling process. Motor drive control and position confirmation operations in the CPU 1 interrupt control process thus maintain accurate carriage movement.

OBJECTS OF THE INVENTION

However, there is a problem with the CPU interrupt control process as described above. In that process the CPU load is increased by reading control data from memory whenever drive control is needed. The CPU normally executes many different processes, and if overall CPU processing power is not sufficient for interrupt control and these other processes, the interrupt process time varies and it can be difficult to sustain fast, high precision drive control. To suppress fluctuation in the interrupt process and enable high precision motor control in such cases, it is necessary to accelerate the CPU or take other measures. This is also true when the drive error detection operation and process are run within the CPU interrupt process.

The present invention therefore provides a drive mechanism control device that minimizes CPU interrupt processes after drive control starts, a corresponding control method that can be easily changed as necessary, and a program for implementing this control method.

The present invention further provides a drive control device and control method capable of detecting drive errors and minimizing CPU interrupt processes after drive control starts.

Another object of this invention is to provide a drive control drive for comparing a logical drive operation determined from the control data with the actual drive operation to confirm whether drive control is normal and enable precise drive control.

SUMMARY OF THE INVENTION

With consideration for and as a result of research into solutions for the aforementioned problems, the inventor has found that the above problems can be solved by using a direct memory access controller to read timing and control data from memory and send the control data to a drive controller.

With the present invention, drive timing data contained in a table for controlling drive timing and plural tables for recording control data used at each control change timing for each of plural control data types are stored to memory before the drive mechanism is driven. When the CPU issues a drive start request, the DMA reads the first timing data, which triggers reading the first control data and the next timing data. As a result, the DMA sequentially reads the control data type for each timing at which drive mechanism operation changes, and sends the necessary control data to the drive mechanism. Drive mechanism operation can thus be controlled independently of, and without any, CPU interrupts once operation starts. The change timing is controlled by setting the timing data to a timer.

According to one aspect of the present invention, a drive mechanism control apparatus is provided. Such an apparatus comprises a driver; a drive controller in communication with the driver; a data generator for generating control data for controlling the driver, and for generating timing data for controlling output timing of the control data to the drive controller, wherein the drive controller controls operation of the driver based on the transmitted control data; a storage medium for storing the timing data and control data; a timer for starting a timing operation upon receipt of timing data, and for outputting a time-up signal when a time specified by the received timing data elapses; a first direct memory access for reading the timing data from the storage medium, and for sending the read timing data to the timer when activated by a specific signal; and a second direct memory access for reading control data from the storage medium, and for sending the read control data to the drive controller when the time-up signal is received from the timer.

The data generator can be configured to generate plural timing data and plural control data corresponding to the plural timing data; the second direct memory access is configured to output to the first direct memory access a start signal to cause the first direct memory access to start reading second timing data after the second direct memory access completes the sending of control data corresponding to the first timing data to the drive controller; and the first direct memory access is configured to read the second timing data from the storage medium and send the second timing data to the timer based on the start signal.

The second direct memory access may further comprise a first control unit, activated by the time-up signal from the timer, for reading, from among plural control data stored to the storage medium, first control data corresponding to the first timing data each time the time-up signal is received, and for sending the read first control data to the drive controller; and a second control unit, activated by completion of sending the first control data, for reading, from among the plural control data stored to the storage medium, second control data corresponding to the second timing data, for sending the read second control data to the drive controller, and then for outputting the start signal to the first direct memory access.

The drive mechanism control apparatus may further comprise a stepping motor. In this case, the timing data comprises timing data for controlling a phase change timing of the motor, and the control data comprises phase pattern data that is set when the motor phase changes and phase current data for controlling current supplied to the motor when the motor phase changes.

When a stepping motor is employed, the data generator preferably generates basic timing data, phase pattern data, and phase current data for use during motor acceleration, deceleration, and constant speed operation, and generates the timing data, first control data, and second control data based on the basic timing data.

The drive mechanism control apparatus may further comprise a head drive, wherein the timing data and control data comprises data controlling head drive timing, drive trigger data for actually driving the head, and print data.

In a drive mechanism control apparatus according to another aspect of the invention, there is a driver and a drive controller in communication with the driver. The drive mechanism control apparatus further comprises a data generator for generating control data for controlling the driver, and for generating timing data for controlling output timing of the control data to the drive controller, wherein the drive controller controls operation of the driver based on the transmitted control data; a storage medium for storing the timing data and control data; a timer for starting a timing operation upon receipt of timing data, and for outputting a time-up signal when a time specified by the timing data elapses; a direct memory access for reading the timing data from the storage medium, and for sending the read timing data to the timer when activated by a specific signal, and then for sending control data from the storage medium to the drive controller based on the time-up signal output from the timer; a position detector for outputting a position detection signal when an operating part of the drive mechanism reaches a first reference position; and a drive confirmation unit for computing a logical operating position of the drive mechanism from the sent control data, for confirming drive mechanism operating status by comparing the logical operating position with the actual operating position based on the position detection signal, and for outputting an operating error signal when a drive operation error is detected.

The drive confirmation unit may comprise a comparison data storage unit in which specific count values are stored; a counter that is initialized when the operating part is at a second reference position and counts each time the time-up signal is received; and a comparator for comparing the value of the counter with a specific count value stored in the comparison data storage unit. In this configuration, the operating status of the drive mechanism is confirmed according to the comparison result of the comparator when the position detection signal is received.

The comparison data storage unit may comprise a first comparison data storage unit for storing an allowable lower limit of a specific count value for measuring movement of the operating part from the second reference position to the first reference position; and a second comparison data storage unit for storing an allowable upper limit of the specific count value for measuring movement of the operating part from the second reference position to the first reference position. With this arrangement, the drive confirmation unit outputs the operating error signal if the position detection signal is received when the value of the counter is less than or equal to the allowable lower limit or greater than or equal to the allowable upper limit.

The drive confirmation unit can also output the operating error signal as an interrupt signal to the data generator, and the data generator performs an error handling process corresponding to the operating error based on the interrupt signal.

In addition, a stop drive signal for stopping drive mechanism operation can be output based on the operating error signal from the drive confirmation unit.

The drive mechanism control apparatus may further comprise a stepping motor. In this case, the timing data includes data for activating the change timing for the stepping motor phase change, a phase pattern for each change timing, and a supply current value for each change timing.

In addition to the stepping motor, the drive mechanism control apparatus may further comprise a carriage that is driven by the motor.

The drive mechanism control apparatus may further comprise a carriage for an ink Jet print head. In this case, the drive confirmation unit performs the drive confirmation process when the carriage is driven to accomplish an ink jet head cleaning operation.

According to another aspect of the present invention, a drive mechanism control method is provided. Such a method comprises steps for (a) generating and storing plural types of control data for controlling a driver and plural timing data for sequentially transmitting the plural control data one at a time; (b) reading first timing data of the plural timing data; (c) starting a timing operation when the read first timing data is received, and outputting a time-up signal when a time specified by the first timing data elapses; (d) reading one control data type based on the time-up signal, and sending that control data type to a drive mechanism controller; (e) reading next timing data of the plural timing data when the control data type read in step (d) is sent to the drive mechanism controller, and repeating steps (c) and (d) for next timing data, another control data type, and another time-up signal; and (f) repeating step (e) until all of the stored plural timing data has been read.

Step (d) may comprise (d1) sequentially and individually reading each type of control data from a first control data type to a last control data type according to the corresponding time-up signal, and sending each read control data type to the controller.

A stepping motor may be employed in the drive mechanism, in which case the plural timing data can comprise phase change timing data for changing the phase of the motor, and one type of control data comprises phase pattern data that is applied to the stepping motor at each phase change and phase current data for controlling current supplied to the motor when the motor phase changes.

Alternatively, or in addition to, the stepping motor, the drive mechanism may comprise a head drive. In this case, the plural timing data can comprise head drive timing data for controlling the timing of a head drive, and one type of control data comprises head drive trigger data and print data.

According to another aspect of the invention, a drive operation confirmation method for a drive mechanism is provided. Such a method comprises steps for (a) generating and storing plural control data for accomplishing a specific confirmation drive process and plural timing data controlling the timing of transmission of the plural control data; (b) driving the drive mechanism by sequentially reading the plural timing data, and sequentially reading and transmitting the plural control data at specific timing intervals, based on the read timing data, to a drive mechanism controller; (c) calculating a drive amount of the drive mechanism based on the read and transmitted plural timing data and plural control data; (d) calculating a difference between an actual operating position and a calculated operating position of an operating part of the drive mechanism, based on a position determined from the calculated drive amount and a position determined from a position detection signal; and (e) outputting an operating error signal when the difference between the calculated operating position and the actual operating position is outside a specific range.

Step (c) may comprise counting transmissions of control data sent at the specific timing intervals in step (b).

Step (e) may comprise outputting a stop signal stopping drive mechanism operation when the difference between the calculated operating position and the actual operating position is outside the specific range.

The plural timing data may comprise timing data for changing a stepping motor phase pattern and change timing control data for changing the current control data, and the plural control data comprises phase pattern data for each changing timing, and current control data supplied at each change timing.

In further aspects of the present invention, a computer program and/or a machine-readable medium storing such a program for directing a machine to perform the steps of any of the methods described above. The storage medium storing such a computer program can be a compact disc, floppy disc, hard disk, magnetically recordable tape, or electromagnetic signal.

Other objects and attainments together with a fuller understanding of the invention will become apparent and appreciated by referring to the following description and claims taken in conjunction with the accompanying drawings.

KEY TO THE FIGURES

Figure 1:
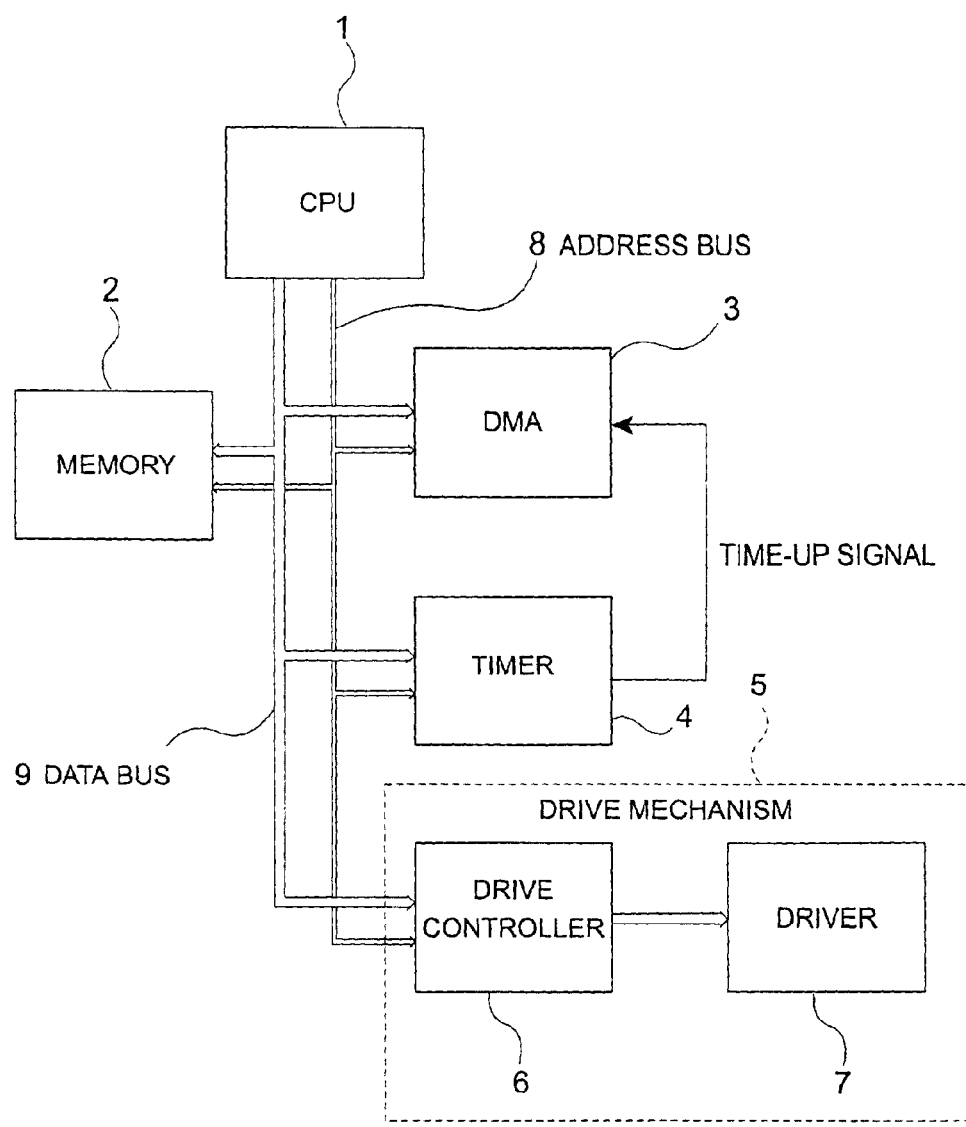
FIG. 1 is functional block diagram showing the configuration of a drive control device to which the present invention is applied.

1 CPU
2 memory
3 DMA
4 timer
5 drive mechanism
6 drive controller
7 driver
8 address bus
9 data bus
10 timing data storage
11 first control data storage
12 second control data storage
13 N-th control data storage
14 first direct memory access
15 second direct memory access
16 first controller
17 second controller
50 drive confirmation unit
70 drive mechanism
24 motor drive controller
74 motor driver
25 motor
73 carriage
71 power transfer mechanism
72 home position detector

DESCRIPTION OF THE PREFERRED EMBODIMENTS

The preferred embodiments of the present invention are described below with reference to the accompanying figures.

FIG. 1 is a schematic block diagram of the configuration of a drive control device, including a drive mechanism, according to a first embodiment of the present invention. The central processing unit 1 accomplishes various operations, processes, and control according to a program (including firmware and OS) stored in memory 2. A direct memory access controller ("DMA" below) 3 enables data to be exchanged between memory 2 and other I/O devices without going through CPU 1. For ease of description, only timer 4 and drive mechanism 5 are shown in FIG. 1 as I/O devices. However, it is to be understood that other I/O devices may be included.

The memory 2 read address and send destination for the read data are specified by address line 8, and the read data is output via data bus 9. When timing data is sent from memory 2 to timer 4, the timer tracks time according to the received timing data, and outputs a time-up signal to the DMA 3 when the specified time elapses. The DMA 3 then sends the specified data from memory 2 to drive controller 6, and driver 7 of drive mechanism 5 operates according to the control data.

Figure 2:
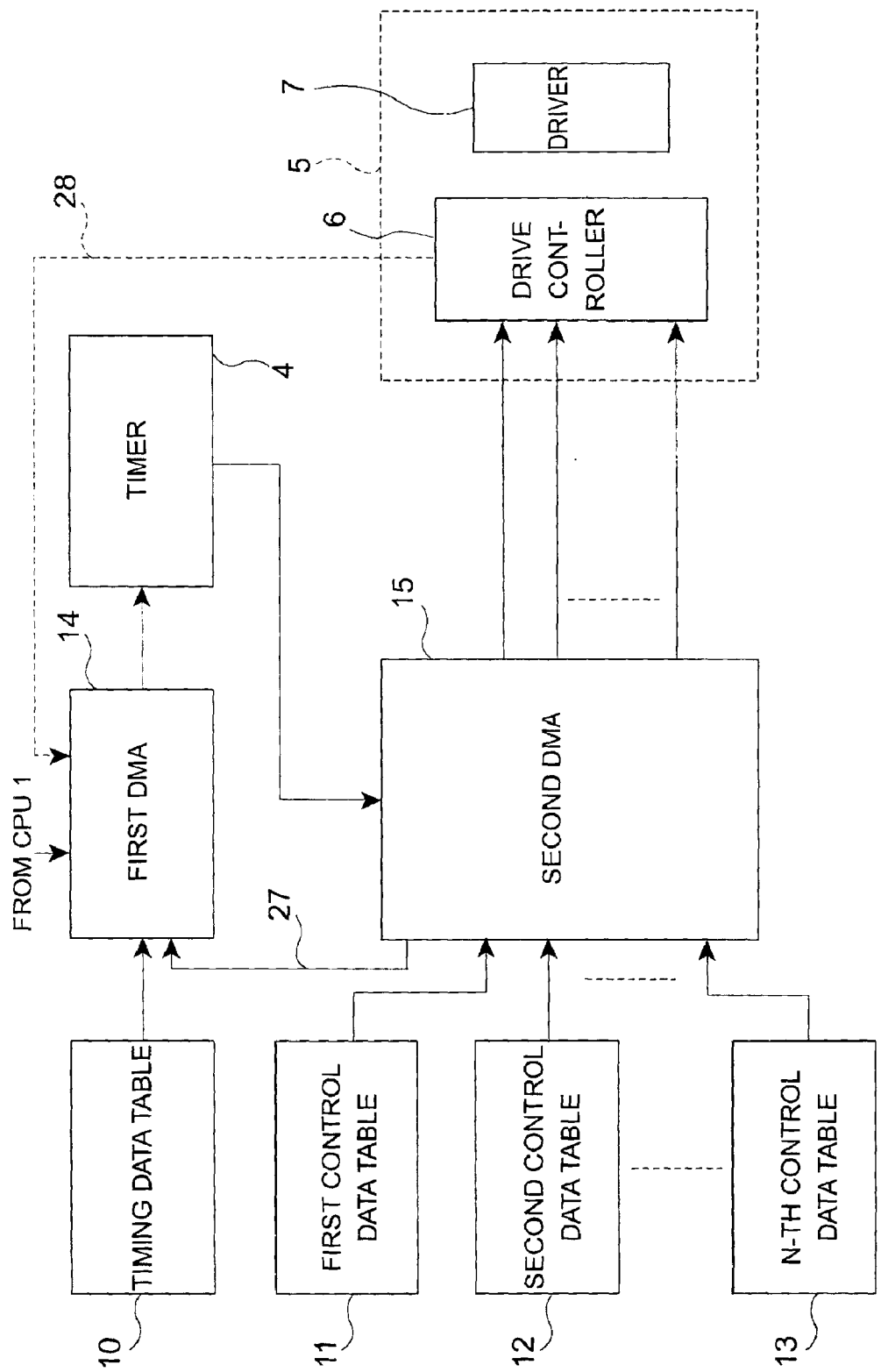
FIG. 2 is a functional block diagram showing the configuration of a first preferred embodiment of the present invention.

A more detailed example of the drive control device is described next with reference to FIG. 2, which is a functional block diagram. Referring to FIG. 2, timing data storage 10 stores the data controlling the timing at which drive mechanism operation switches. A first control data storage 11 stores first control data for controlling drive mechanism operation after operation switches, second control data storage 12 stores second control data, and N-th control data storage 13 stores the N-th control data. Note that timing data storages 10 to 13 are preferably implemented as tables and are achieved by allocating a specific address space in memory. Specific data is stored to these storage tables by the CPU 1 before the start of the drive operation.

A first direct memory access (DMA) 14 and second DMA 15 are also provided. Note that first DMA 14 and second DMA 15 can be achieved in a single direct memory access unit, or using plural discrete DMA units.

Timer 4 clocks time based on the timing data, and outputs a time-up signal. A drive controller 6 controls the driving of driver 7 based on received control data sent from the first controller 16 (see FIG. 3) and second controller 17 (see FIG. 3). The driver 7 is typically a stepping motor or print head, but is not so limited. Operation is described next.

When a start driving signal is sent from CPU 1 to first DMA 14, first DMA 14 reads first timing data from the table in timing data storage 10, and sends the timing data to timer 4. The timing data as used here specifies the time interval from the current operating state until operation is changed to a next operation. When the timing data is sent to timer 4, the timer starts counting the time indicated by the timing data and outputs a time-up signal to second DMA 15 when the specified time has elapsed.

When this time-up signal is received, second DMA 15 first reads the control data stored first to first control data storage 11, and sends the control data to drive controller 6 of drive mechanism 5. When sending this first control data is completed, the control data stored first to second control data storage 12 is read and sent to drive controller 6. This operation continues to sequentially send the first control data stored to the N-th control data storage 13, which stores the N-th control data needed for drive control, to the drive controller 6. The drive controller 6 then controls driver operation based on the first to N-th control data (n control data) thus received. It should be noted that "N" is a desired number and differs according to the number of types of control data needed to control driving the particular drive mechanism, such as print head, carriage, or paper feed mechanism.

When the last, that is, the N-th, control data is sent to drive controller 6, first DMA 14 is activated again by a particular trigger such as sending the N-th control data to drive controller 6. It should be noted that while the completion of control data transmission is preferably the trigger for again activating first DMA 14, another event relating to control data transmission (such as start of transmission) can be alternatively used. The trigger is assumed here to be the completion of control data transmission.

As shown by solid line 27 in FIG. 2, first DMA 14 can be activated by an interrupt signal sent from second DMA 15 to first DMA 14 when sending the N-th control data ends. Alternatively, first DMA 14 can be activated by drive controller 6 sending an interrupt signal to the first DMA 14 as indicated by dotted line 28 in FIG. 2.

When triggered by the activate signal from second DMA 15 or drive controller 6, first DMA 14 reads the second timing data from timing data storage 10, and sends this timing data to timer 4. Timer 4 then clocks the time specified by the received timing data, and sends a next (second in this case) time-up signal to the second DMA 15 when the specified time passes.

When this time-up signal is received, the second DMA 15 sequentially reads the control data stored second to the first to N-th control data tables, and sends the read control data to drive controller 6.

The driver 7 is thereafter driven according to the timing data and control data stored to timing data table 10 to N-th control data table 13 until the specified drive operation is completed. It is thus possible to precisely and accurately control drive mechanism operation without involving the CPU 1 once drive operation starts if the CPU 1 stores all timing data and control data needed for the particular drive mechanism as the control data (such as drive distance or speed) for driver 7 to tables 10 to 13 before driving starts.

The second DMA 15 is described in further detail next.

It should be noted that while in FIG. 2 first to N-th control data tables (N types) is used as the control data other than the timing data for controlling drive mechanism operation, the types of control data actually used will vary according to the drive mechanism and drive mode. For example, two types of control data are typically used in addition to the timing data to control driving a stepping motor. Therefore, to simplify the present description, timing data and two types of control data are used by way of example only.

Figure 3:
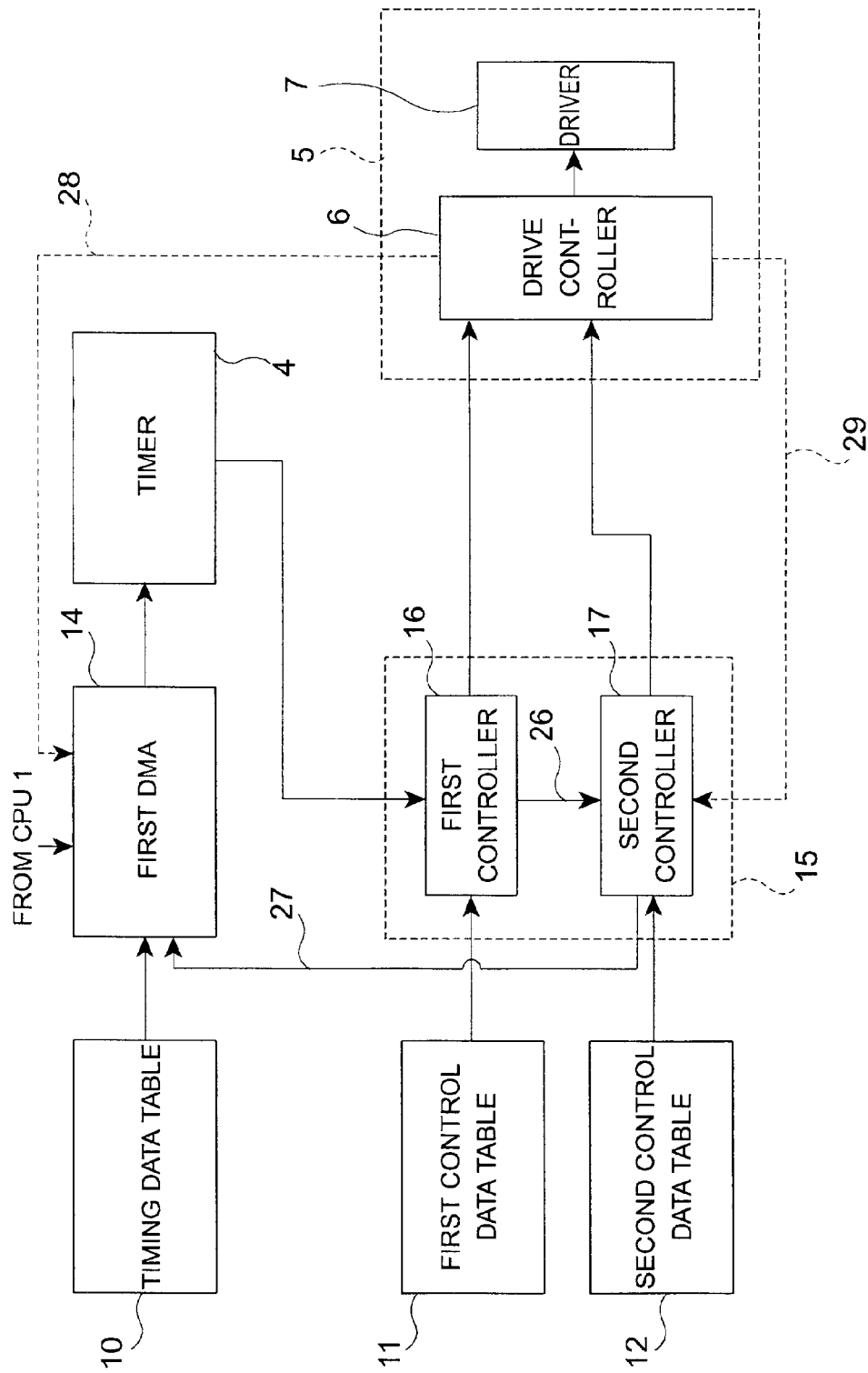
FIG. 3 is a functional block diagram showing in further detail the configuration of a first preferred embodiment of the present invention.

FIG. 3 is a functional block diagram showing the configuration of an embodiment using timing data and two types of control data and illustrates a more detailed example of the second DMA 15. The second DMA 15 comprises a first controller 16 and a second controller 17 corresponding to the control data types. Note that the first and second controllers 16 and 17 are direct memory access controllers capable of reading data directly from memory without going through the CPU.

When timing data is sent from first DMA 14 to timer 4 and timer 4 detects that the time specified by the timing data has passed, timer 4 sends a time-up signal to first controller 16.

When the time-up signal is received, first controller 16 reads the first control data from the first control data table stored to first control data storage 11, and passes the read data to drive controller 6 of drive mechanism 5. When sending the first control data to drive controller 6 ends, second controller 17 is activated. Note that second controller 17 can be comprised to activate when first controller 16 sends an interrupt signal (indicated by solid line 26) to second controller 17 after sending the first control data ends, or to activate when drive controller 6 sends an interrupt signal (indicated by dotted line 29) to second controller 17 after receiving the first control data is completed.

The second controller 17 reads the second control data first stored to second control data table 12, and sends it to drive controller 6. Based on this control data, drive controller 6 starts operation of driver 7 when the first control data is received or when both the first and second control data are received.

When sending the second control data to drive controller 6 ends, first DMA 14 is activated. Note that the first DMA 14 can be activated by sending an interrupt signal (solid line 27) from second controller 17 to first DMA 14 after sending the second control data ends, or by sending an interrupt signal (dotted line 28) from drive controller 6 to first DMA 14.

When first DMA 14 receives an interrupt signal from second controller 17 or drive controller 6, it reads the next (second) timing data from the timing data table, and sends it to timer 4. The timer 4 then clocks the time based on the received timing data, and when the specified time passes sends a next (second) time-up signal to first controller 16.

As described above, the first controller 16 then reads the first control data from the first control data table, and sends it to the drive controller 6. When sending the first control data ends, the second controller 17 is again driven as described above to read the second control data from the second control data table and send the data to the drive controller 6. Operation of the driver 7 based on the previous control data stops at this point and operation based on the next control data starts.

The above described operation continues so that driver 7 is driven based on the timing data and drive control data stored to timing data table 10, first control data table 11, and second control data table 12 until the specific drive operation ends.

Figure 4:
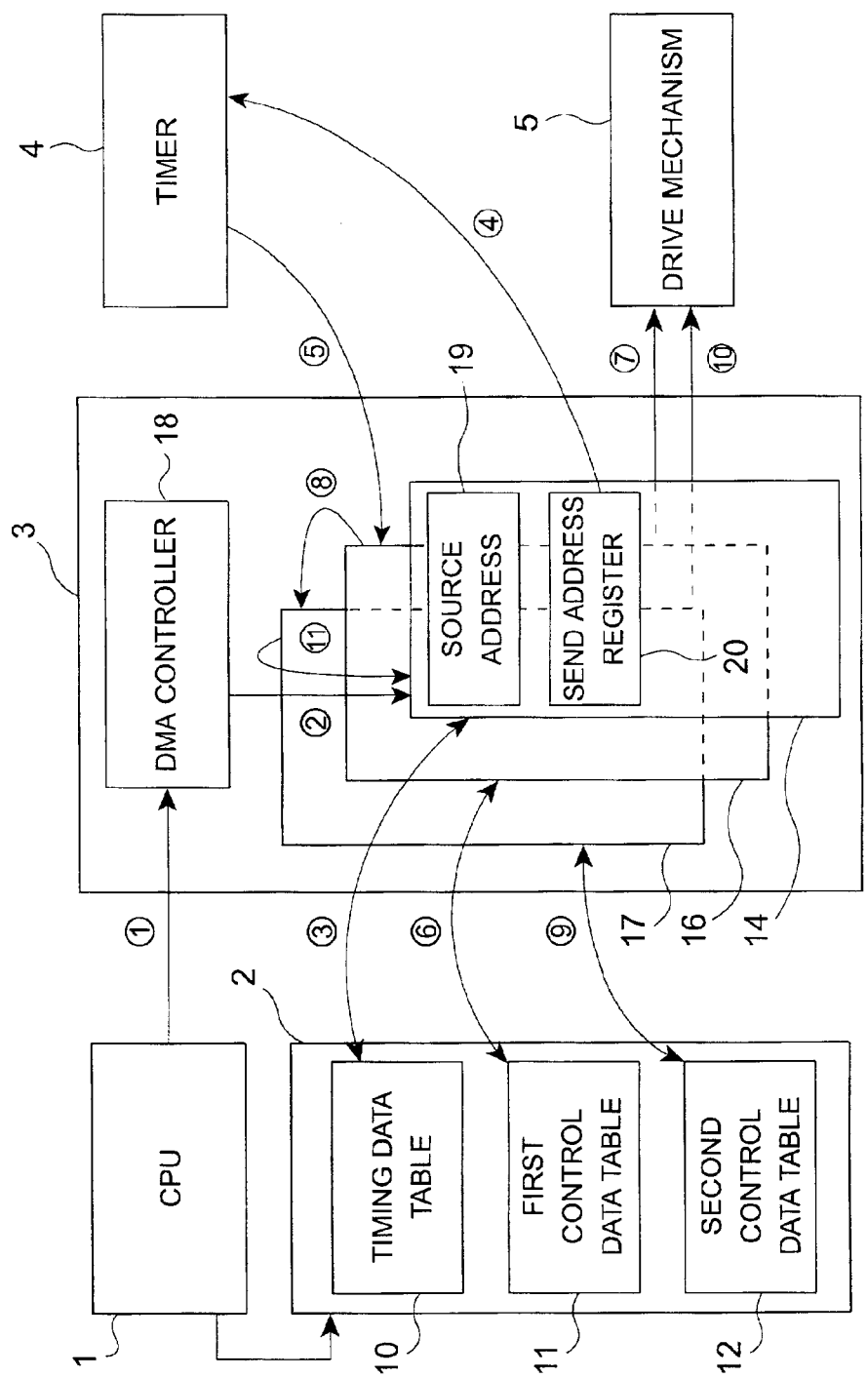
FIG. 4 illustrates the data flow and data transmission procedure when the control device shown in FIG. 3 sends control data to the drive mechanism.

FIG. 4 shows the data flow and data transmission procedure for sending timing data and control data to the drive mechanism 5. As noted above, timing data table 10, first control data table 11, and second control data table 12 may each be a specific address space in memory 2, and first DMA 14, first controller 16, and second controller 17 may be embodied in DMA 3.

Before drive mechanism operation starts, CPU 1 first writes the timing data, first control data, and second control data for controlling the drive mechanism 5 to be driven to specific addresses in memory 2. Operation then proceeds as described below to control the operation of drive mechanism 5.

(1) CPU 1 sends a signal for activating first DMA 14 to DMA controller 18 of DMA 3.
(2) DMA controller 18 thus activates first DMA 14.
(3) As described above, first DMA 14 reads data from timing data table 10 of memory 2. The address of the read data is stored to a source address register in first DMA 14 and is incremented to specify the next data address after each read.
(4) The read timing data is then sent to timer 4 based on the address specified in send address register 20.
(5) The timer 4 monitors the passage of the time specified by the timing data, and sends a time-up signal to first controller 16 when the indicated time is up. A typical timer can be used for timer 4.
(6) When the time-up signal is received, first controller 16 reads the first control data by referencing its own source address register (not shown in the figure). The address stored to the source address register is then incremented to the next data address.
(7) The read first control data is then sent to drive mechanism 5 based on the address in the send address register (not shown in the figure).
(8) The second controller 17 is activated when sending the first control data ends.
(9) The second controller 17 then read the second control data. As with first DMA 14 and first controller 16, the second controller 17 send address register (not shown in the figure) is then incremented to the next data address.
(10) The read second control data is sent to drive mechanism 5.
(11) When sending the second control data ends, first DMA 14 is activated again and reads the next timing data based on the incremented address data in send address register 19.

This same process repeats to control drive mechanism operation until driving ends.

As a second embodiment of the present invention, an embodiment applying the principles of the first embodiment to a drive mechanism using a stepping motor as an example of a driver is described next below. However, this embodiment is exemplary only and is therefore not intended to so limit the invention. More broadly, the present invention can also be applied to drive mechanisms using a linear motor, drive mechanisms using ultrasonic oscillators, drive mechanisms using electromagnets, drive mechanisms using a combination of these, as well as all other types of drive mechanisms consistent with the technical concept of the invention. The drive mechanism control device and method of the present invention is therefore not limited to use with printers, but may also be applied to ATMs, card readers and scanners, and other types of drive mechanisms.

Figure 5:
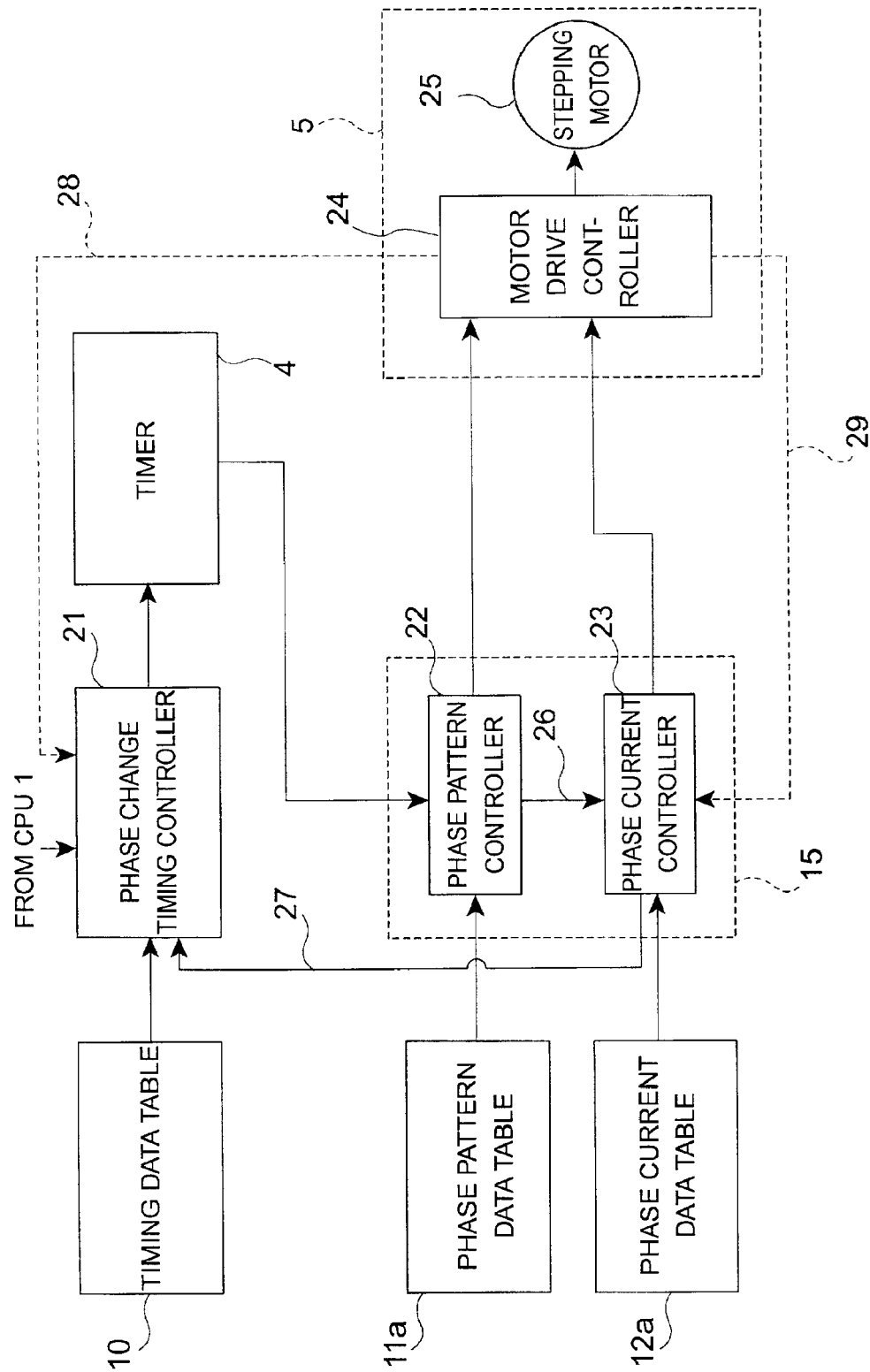
FIG. 5 is a functional block diagram of a control device for controlling stepping motor drive according to a second preferred embodiment of the present invention.

The second preferred embodiment of the present invention is described next with reference to FIG. 5, which is functional block diagram of a control device according to the present invention for controlling the drive of a stepping motor. The first DMA 14, first controller 16, and second controller 17 in FIG. 3 are shown in FIG. 5 as phase change timing controller 21, phase pattern controller 22, and phase current controller 23, respectively. Each of these controllers is a DMA, but the control functions of these components are shown as functional blocks for ease of understanding. These controllers 21 to 23 send specific control data to motor drive controller 24 to control the driving of stepping motor 25.

Figure 6:
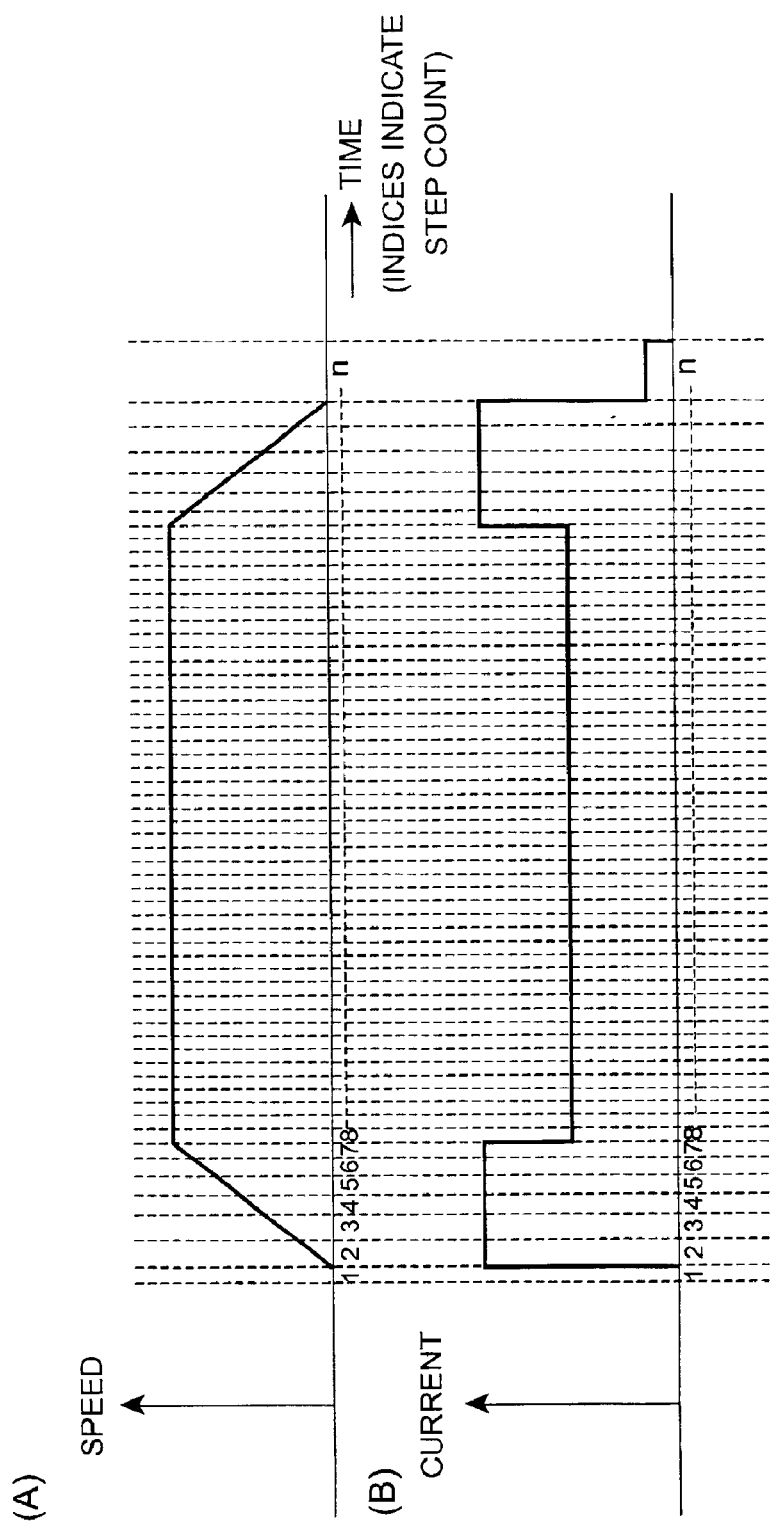
FIG. 6 is a graph showing the typical control of a motor for driving a stepping motor.

FIG. 6 is a graph showing a typical example of motor control for driving stepping motor 25. Driving a stepping motor requires sequentially changing the phase of voltage applied to the motor. It is also necessary to gradually accelerate the motor from the start of motor operation as shown in FIG. 6(A) until motor speed reaches a constant speed, then maintain this speed, and finally decelerate the motor when the stop position is approached. The phase change timing therefore differs during acceleration, constant speed operation, and deceleration. Current control is also necessary during each of acceleration, constant speed operation, and deceleration.

To start driving the motor, it is necessary to provide a high current supply to start and acceleration motor rotation (see FIG. 6(B)). Less current is needed to maintain constant speed operation, but a high current supply must be provided again during deceleration in order to brake the motor. It should be noted that as shown in FIG. 6(B) a very low current flow to the motor is maintained even after the motor stops. This is to quickly dissipate any residual excitation of the motor, and a weak current flows to the motor in all phases after the motor stops (this is known as "rush current"). Therefore, after the motor reaches the stop position, the final control data including the rush current phase pattern (all phases), rush current, and rush current supply time is sent to the drive controller, and the motor drive operation ends after the rush current supply time passes.

The numbers below the abscissa of each graph indicate the phase change timing. As shown in FIG. 6, the drive of stepping motor 25 starts from the second phase change timing.

The timing data and other control data, including all control data needed to successively control stepping motor 25 operation from acceleration, constant speed operation, deceleration, to stopping according to the scheduled drive amount of the driver is generated by the CPU 1 before motor drive starts, and is stored to tables 10 to 12*a* in memory 2.

Figure 7:
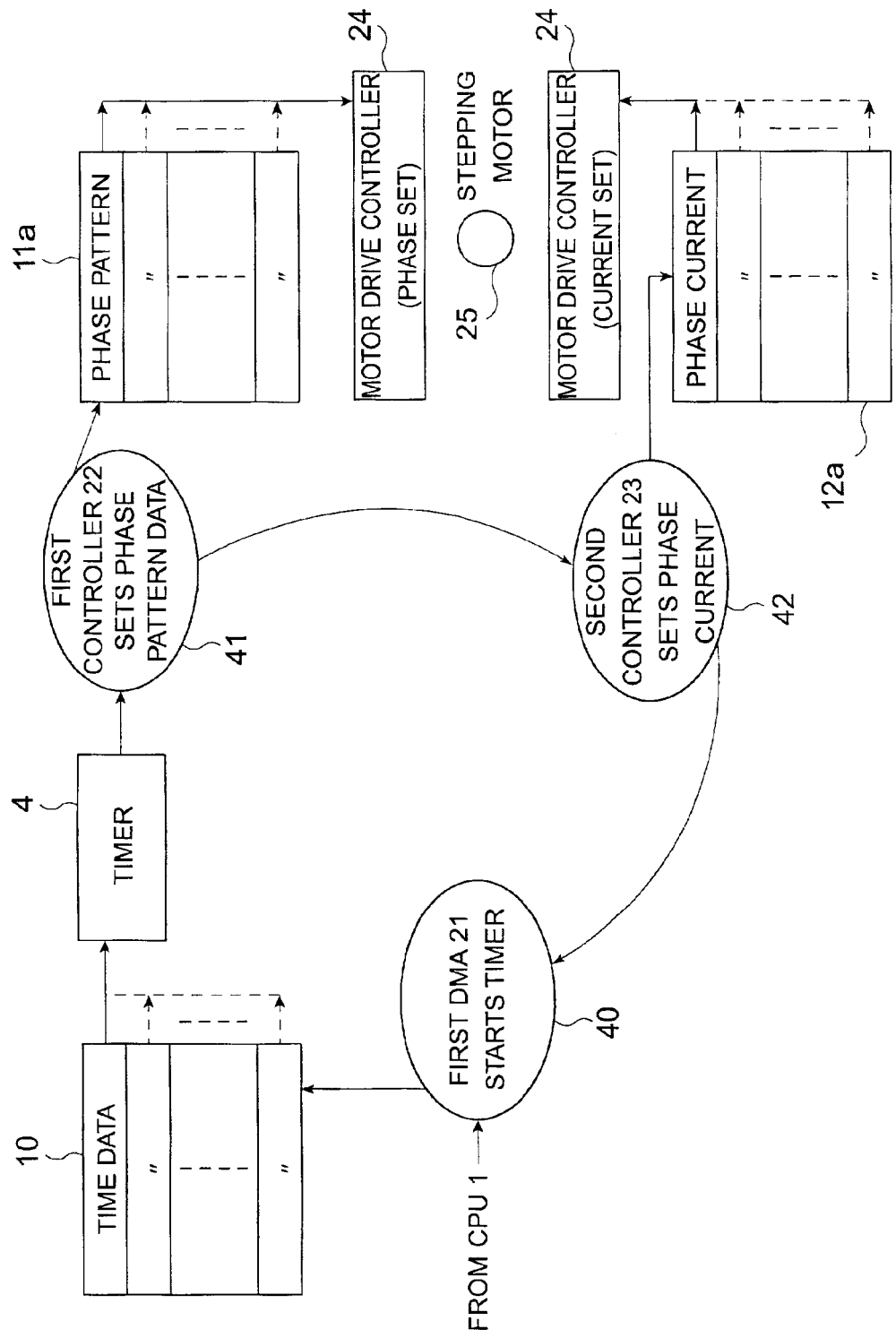
FIG. 7 shows the state transitions of a continuous control operation loop from the start motor drive request to setting the change timing, first control data, and second control data, driving the motor, and setting the next change timing.

This is described in further detail with reference to FIG. 7, which shows the state transitions of the continuous control loop starting from receiving the start motor drive request to setting the change timing data, phase pattern data, phase current data, and then setting the next change timing data.

When the start of drive control by CPU 1 is indicated, first DMA 21 reads the first timing data in timing data table 10 defining the phase change timing, and sends this data to timer 4. The timer 4 monitors passage of the specific time based on the received timing data (state 1: 40).

When timer 4 detects passage of the specific time, first controller 22 reads the first phase pattern from first control data table 11*a*, and sets the phase pattern data in motor drive controller 24 (state 2: 41).

When sending the first phase pattern data ends, second controller 23 reads the first phase current value from second control data table 12*a*, and sets the first phase current to motor drive controller 24. Once the phase current is set drive of stepping motor 25 starts (state 3: 42).

When sending the phase current ends, first DMA 21 is driven again, and reads and sends the next timing data from timing data table 10 to timer 4 (state 1: 40). When timer 4 detects passage of the specific time, second DMA 15 sets the next phase pattern to drive controller 6 (state 2: 41), and then sets the phase current (state 3: 42). Drive based on this second phase pattern thus begins.

As will be understood from the above description, the first timing data is the time for setting the first phase pattern and phase current. The stepping motor 25 operates at the first set phase pattern and phase current until the period specified by the second timing data passes and the phase pattern changes. The stepping motor 25 is then driven according to this next phase pattern and phase current data until the next change timing.

The drive of stepping motor 25 thus starts rotating at the second timing point as indicated in FIG. 6(A), and motor drive is thereafter controlled according to the specified change timing data and control data.

Figure 8:
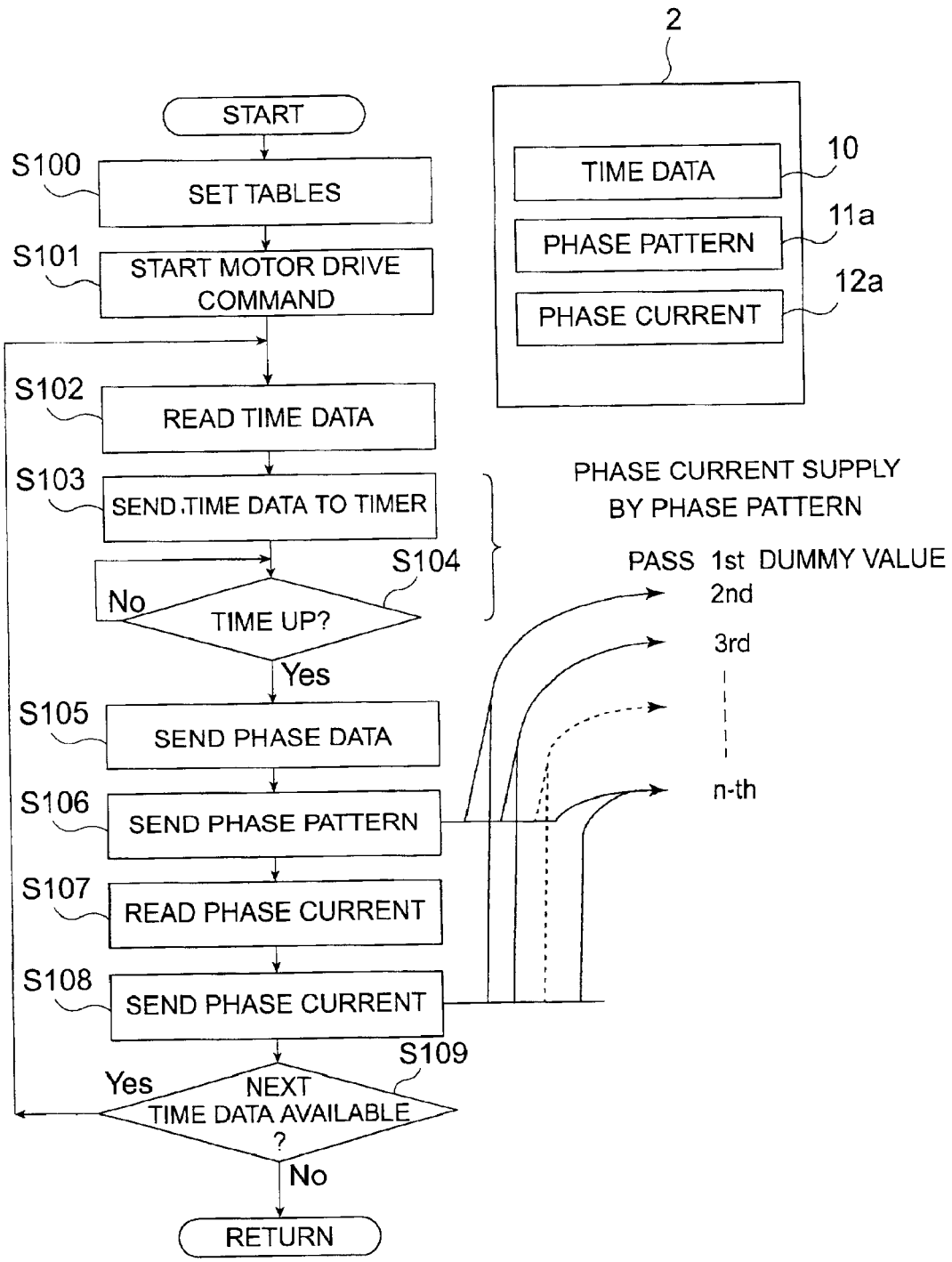
FIG. 8 is a flow chart of the motor drive control process of the second embodiment of the invention.

FIG. 8 is a flow chart describing this motor drive control process.

When drive of stepping motor 25 is requested by a program, for example, CPU 1 computes the phase change timing data (time intervals in this example) required for control from the start to the stop of driver operation, and the phase pattern and phase current data set at each timing change, and stores this data to the tables 10 to 12a reserved at a specific address in memory 2 (S100). The CPU 1 then sends a start motor drive signal to first DMA 21 (S101).

In response to the start drive command from CPU 1, first DMA 21 reads the time data from the timing data table in memory 2 (S102), and sends it to timer 4 (S103). The timer starts operating when the timing data is applied thereto, and continues in this state as long as the time-up signal is not received (S104 returns no). Timer 4 outputs a time-up signal to first controller 22 after the specified time passes, and when the time-up signal is received (S104 returns yes), first controller 22 reads and sends the phase data and phase pattern from memory 2 to motor drive controller 24 (S105, S106).

When the sending the phase data and pattern ends, second controller 23 reads the phase current data from the phase current data table (S107), and reads and sends the timing data for setting the phase current to the motor drive controller 24 from the timing data table to the timer 4. Phase current thus flows to stepping motor 25, and motor drive starts.

If there is timing data for a next phase change (S109 returns yes), first DMA 21 reads the next timing data from the phase change timing data table and passes it to timer 4 (S102, S103). This state continues until timer 4 detects that the time is up (while S104 returns no). In other words, phase current set by step S108 the first time through this control loop flows to the drive mechanism for the time set by the time data in step S103 (second pass) at the phase pattern set by step S106 (first pass).

When timer 4 detects the time is up (S104 returns yes), the second phase pattern and phase current data are set to motor drive controller 24 (S105 to S108), and current flows for the time controlled by the third time data according to these phase pattern and phase current values (S102 to S104). The same steps S102 to S109 thereafter repeat based on the timing data from the phase change timing data table. This process ends when there is no more timing data in the phase change timing data table.

Figure 9:
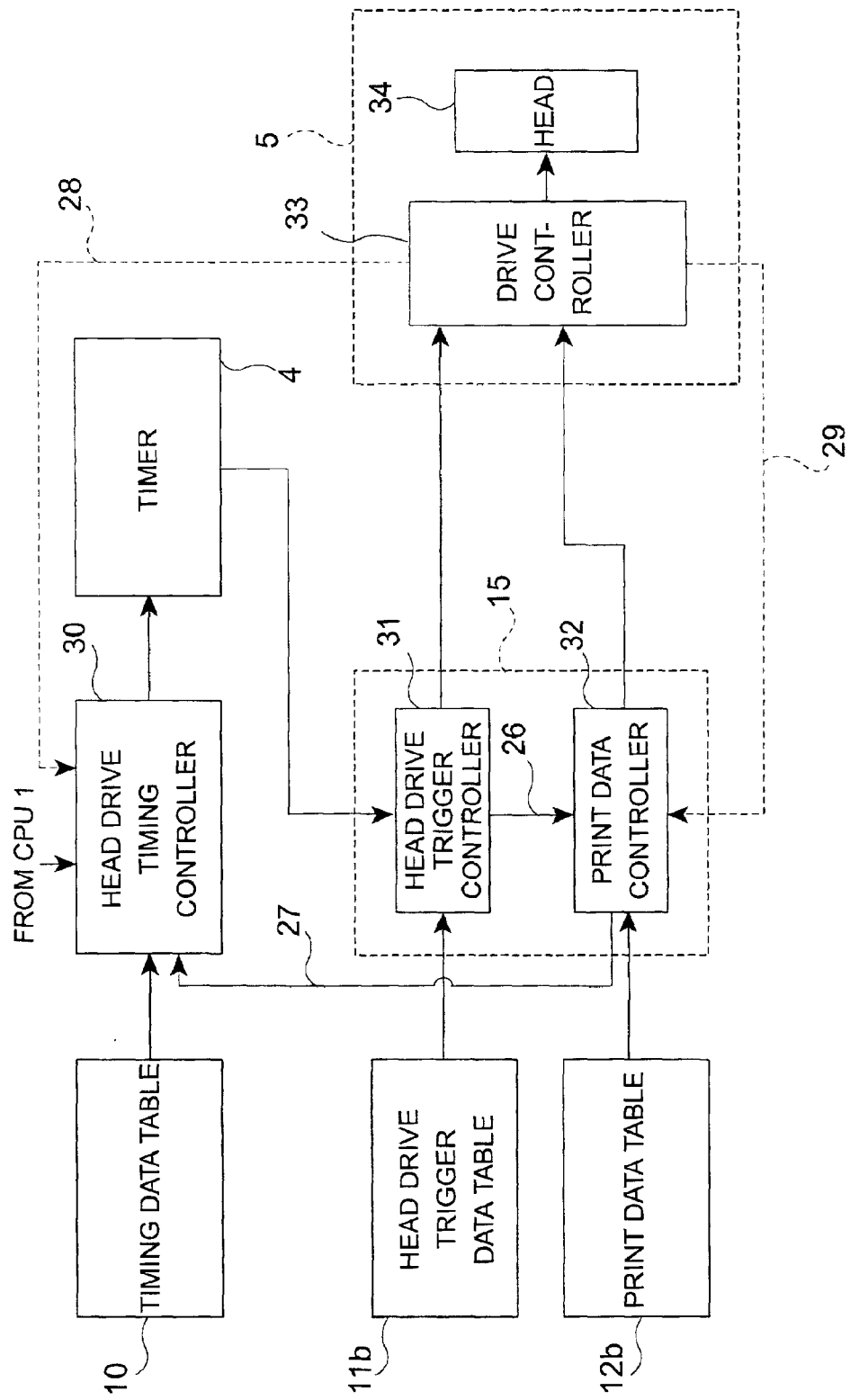
FIG. 9 is a functional block diagram showing a control device according to the present invention for controlling a print head.

A third embodiment of the present invention is described next with reference to FIG. 9, which is a functional block diagram of a control device according to the present invention for controlling print head drive. The first DMA 14, first controller 16, and second controller 17 in FIG. 3 are shown in FIG. 9 as drive timing controller 30, head drive trigger controller 31, and print data controller 32, respectively. As in the case shown in FIG. 3, these controllers 30 to 32 is preferably a DMA, and DMA functions are shown in separate blocks for ease of understanding only. These controllers 30 to 32 send specific control data to a head drive controller 33 to control the drive of print head 34.

The basic operation is the same as described above with reference to the second embodiment, but the processed control data differs. More specifically, the timing data is head drive timing data, and the control data comprises head drive trigger data in data table 11b and print data in data table 12b. This data is written to respective tables by the CPU before drive starts.

Figure 10:
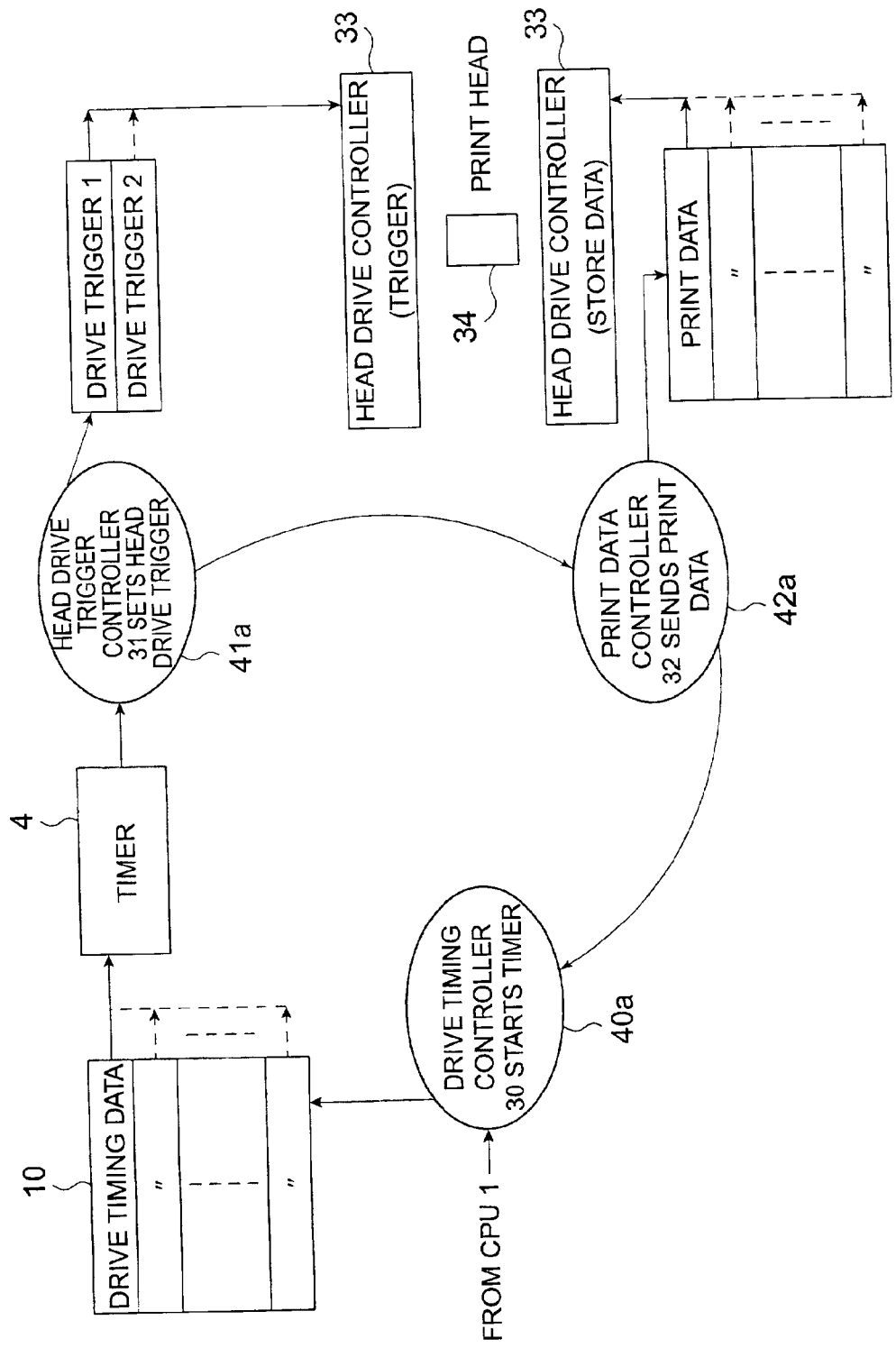
FIG. 10 shows the state transitions of a continuous control operation loop from the start head drive request to setting the change timing, first control data, and second control data, printing, and setting the next change timing.

The basic operation is described next with reference to FIG. 10.

The first DMA drive timing controller 30 first sets the drive timing data to timer 4 (state 1: 40a). When the timer 4 times out, head drive trigger controller 31 sends a drive trigger to the head drive controller to drive the print head (state 2: 41a). Note that nothing is printed at this time because no print data has been sent. Next, print data controller 32 sends, for example, one dot line of print data to head drive controller 33 (state 3: 42a). Note that the amount of print data sent is preferably the amount of data that can be printed in one head drive (printing) operation. The head drive controller 33 stores the received print data and prints it when the next drive trigger is received.

It should be noted that, although the second and third embodiments have been described separately, it is to be understood that these embodiments can be combined and the motor drive control of the second embodiment used to drive a paper transport mechanism, the carriage mechanism, etc. in the printer. Note further that if the motor of the second embodiment is used for driving something other than the carriage mechanism, the second embodiment, this third embodiment and the following fourth embodiment could be combined in a single printer.

In an arrangement which combines the second and third embodiments, the drive controller 24 in FIG. 5 and the drive controller 33 in FIG. 9 can be made to operate in conjunction with each other, as may be required. It is thus possible to separately apply the present invention to a head drive control device and a motor drive control device, and synchronize the operation of these two devices. Operation can be synchronized by, for example, synchronizing the control data for the motor drive mechanism and the head drive mechanism when the control data is generated, and storing the synchronized control data to memory so that actual drive is controlled based on the already-synchronized control data. Other methods could also be used, including synchronizing motor drive timing to the actual head drive timing, or otherwise synchronizing the timing to actual operation.

It will also be noted that, in the configuration described above, next timing and control data is read and output after sending the previous timing and control data is completed. It is also possible to simultaneously send timing data and control data depending on the properties of the particular driver.

A fourth embodiment of a drive control device according to the present invention is described next with reference to FIG. 11, which is a schematic block diagram of this embodiment. The drive mechanism in this embodiment is a carriage drive mechanism for moving the print head of a serial printer horizontally along a print line.

The carriage drive mechanism 70 comprises a motor drive controller 24, a motor driver 74, and a stepping motor 25 for driving a carriage 73 via a power transfer mechanism 71 (comprising a toothed belt, gears, or other functionally equivalent structure). Carriage position and movement are precisely controlled by precisely changing the phases of stepping motor 25.

As in the first embodiment above, CPU 1 is a central processing unit that accomplishes various operations, processes, and control according to a program (including firmware and OS) stored in memory 2. Direct memory access controller 3 enables data to be exchanged between memory 2 and other I/O devices without going through CPU 1.

Firmware and an operating system (OS) for controlling CPU operation, other various programs, and control data needed to control carriage drive mechanism 70 are stored to memory 2. The memory 2 read address and send destination for the read data are specified by address line 8, and the read data is output via data bus 9.

When timing data is sent from memory 2 to timer 4, timer 4 tracks time according to the received timing data, and outputs a time-up signal to the DMA 3 when the specified time elapses. DMA 3 then sends specific data from memory 2 to motor drive controller 24 of carriage drive mechanism 70. The motor controller drives the motor driver 74 according to this control data, and the stepping motor 25 turns. When the stepping motor 25 turns, carriage 73 is moved along the print line in the carriage track by power transfer mechanism 71 (comprising a toothed belt, gears, or other functionally equivalent structure).

A home position sensor 72 is disposed in the carriage path at the home position (HP) of the carriage movement range. This HP detector 72 can be a photodetector, ultrasonic detector, mechanical sensor, or other sensing element.

The output signal from the HP detector 72 is applied to a drive confirmation unit 50, which sequentially tracks the computed carriage 73 position and detects the offset between the actual carriage position and the computed carriage position from the computed carriage 73 position when the HP detector 72 detects the carriage. If the offset is greater than a specified range, an interrupt signal is sent to the CPU. When the CPU detects an interrupt signal from the drive confirmation unit 50, it runs a specific error handling process.

Figure 11:
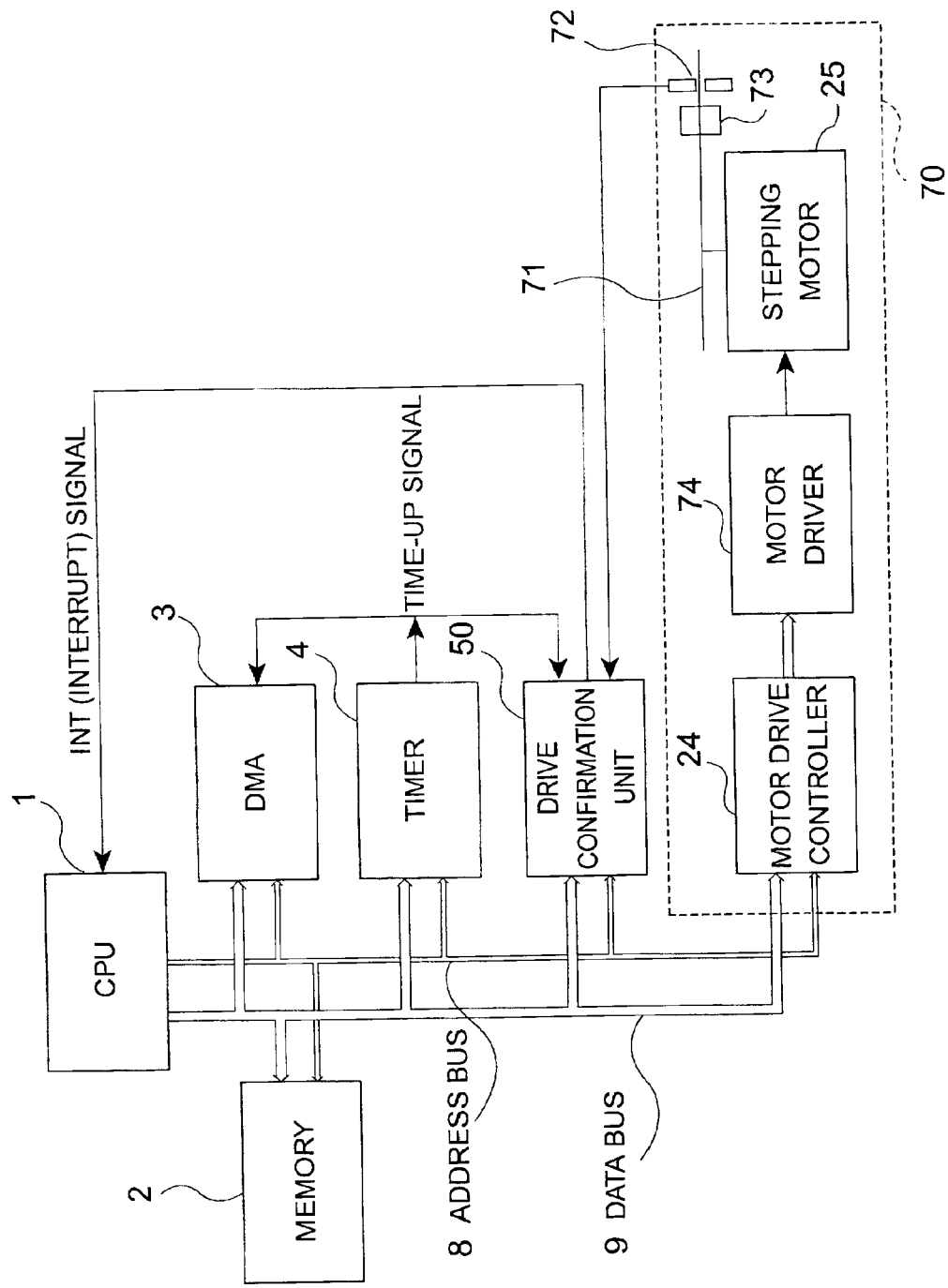
FIG. 11 is a functional block diagram showing the configuration of a drive mechanism control device according to a third embodiment of the invention where the drive mechanism is a carriage drive mechanism for moving the print head of a serial printer horizontally along the print line.

The embodiment shown in FIG. 11 is described in further detail next with reference to FIG. 12, which is a functional block diagram describing the operation of the carriage drive mechanism controller in greater detail. Note that control data tables 10 to 12a are contained in memory 2. The control data stored to these tables is the data needed to control motor drive according to the movement of the carriage to be driven. The control data is generated according to a motor drive control program stored to memory 2 before the motor drive operation starts.

Figure 12:
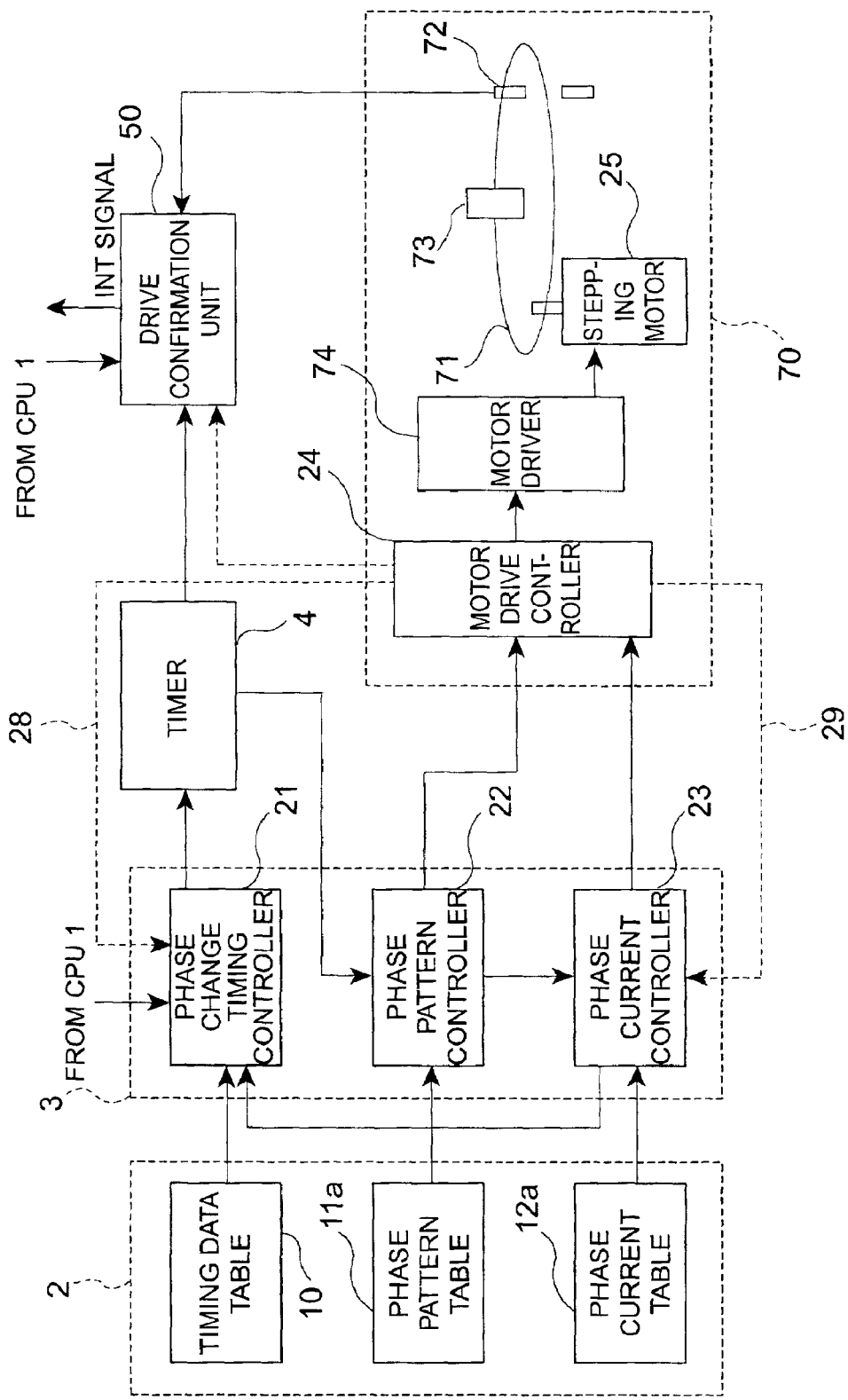
FIG. 12 is a functional block diagram for describing in further detail the operation of the carriage drive mechanism control device shown in FIG. 11.

Referring to FIG. 12, timing data table 10 stores the data controlling the timing at which motor operation switches. Phase pattern data table 11a stores the phase pattern data of the voltage supplied to the motor at each change of operation, and phase current table 12a stores the phase current data controlling phase current flow to the motor at each change of operation. It should be noted that FIG. 12 shows two types of control data being stored, but more or less types of control data can be stored as may be needed. Furthermore, this data can be stored in a register or other storage medium (not shown in the figure) rather than in memory 2.

Data tables 10 to 12a in memory 2 are read respectively by phase change timing controller 21, phase pattern controller 22, and phase current controller 23 of DMA 3, and the read data is passed thereby to other specific parts. Controllers 21 to 23 are DMA devices, and sequentially send the control data read from controllers 21 to 23. The first send operation of the DMA is activated by a start operation signal from CPU 1. Thereafter, controllers (DMA) 21 to 23 are sequentially made active to read and send the respective data signals by means of a time-up signal or the end of each send operation.

Timing data is first sent by phase change timing controller 21 from timing data table 10 to timer 4. After the period indicated by the timing data passes, timer 4 outputs a time-up signal to phase pattern controller 22 and drive confirmation unit 50. When the time-up signal is received, phase pattern controller 22 reads and sends the phase pattern data to motor drive controller 24 from first control data table 11a. The motor drive controller 24 outputs the received phase pattern data to motor driver 74. Next, phase current controller 23 reads the phase current value from second control data table 12a and sends it to motor drive controller 24. The motor drive controller 24 outputs the received phase current value to motor driver 74, and the stepping motor 25 then starts turning. When the stepping motor 25 starts turning, power transfer mechanism 71 causes carriage 73 to begin traveling through the carriage path.

When sending the phase current data ends, phase current controller 23 passes control to phase change timing controller 21. The phase change timing controller 21 thus reads the next timing data and sends it to timer 4. The timer 4 outputs a time-up signal when the specified time passes, making phase pattern controller 22 active to send the next phase pattern. The same process thereafter continues so that stepping motor 25 gradually accelerates and drives movement of carriage 73.

Figure 13:
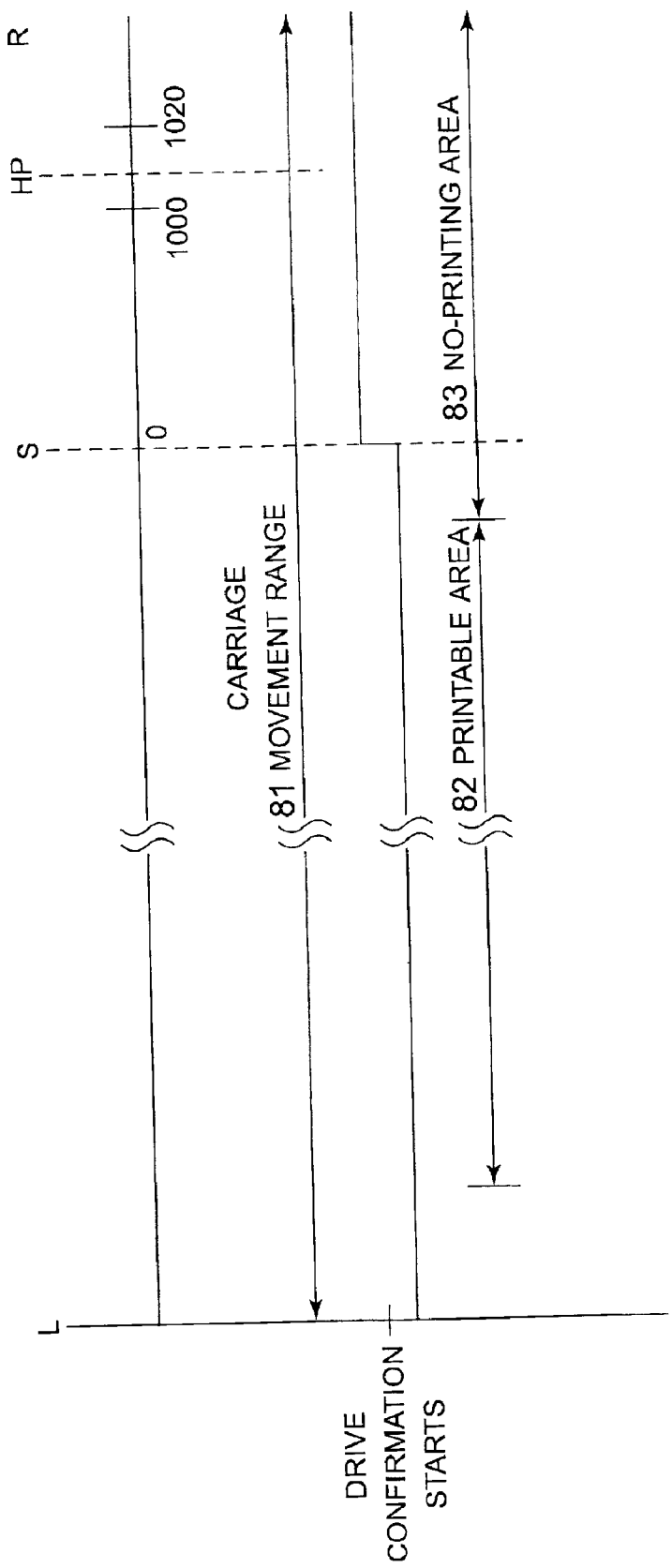
FIG. 13 shows the locations of serial printer carriage movement range, printable area, no-printing area, and the home position.

The carriage path is described next with reference to FIG. 13, which shows the carriage movement range 81, printable area 82, no-printing area 83, and home position (HP) locations of a typical serial printer. The greatest part of the carriage movement range is printable area 82. Printing is accomplished by the print head (not shown in the figure) as the carriage 73 travels through the printable area 82. The printable area 82 differs according to the type of printer, for example, and for simplicity only one printable area 82 is shown in FIG. 13. A specific area from the right end is no-printing area 83. The carriage 73 can travel through the no-printing area 83, but printing is prohibited.

A home position detector 72 (see FIGS. 11 and 12), which is equivalent to a location sensor, is disposed to a particular position (e.g., a first reference position) known as the home position (HP) in the no-printing area 83. When the carriage 73 moves across the home position sensor, the home position sensor detects the carriage 73 and thus makes it possible to confirm if the carriage 73 has actually moved to the home position. The HP detector 72 outputs a detection signal to the drive confirmation unit 50 when it detects the carriage.

The carriage 73 is moved by driving the stepping motor 25. To print to an area containing one continuous line, for example, carriage 73 moves from the right end of the printable area 82 to the left end of the printable area. When printing is completed, the carriage 73 can be designed to stop at that position, return to the right end of the printable area, or move to some other desired position.

As noted above, moving carriage 73 to print is accomplished by generating and storing to memory the motor control data required to a specific movement, the stored control data is then read by a DMA device and sent to the drive controller. Generating and storing the motor control data to memory can be accomplished by means of a CPU and specific program.

As is the case for printing, a carriage drive operation for confirming whether the carriage drive operation is correctly accomplished ("drive state confirmation" below) is also achieved by generating and storing motor control data to memory in advance of carriage drive, and then sequentially reading and sending this data by means of a DMA device to the drive controller. This drive state confirmation operation is preferably performed at a regular specific interval in order to achieve precise drive control.

In the case of an ink jet printer, for example, a dummy ink ejection operation is performed regularly when not printing in order to prevent the print head from drying when there is a long interval between printing operations. The carriage is therefore moved regularly (every 6 to 10 seconds, for example) to an ink receptor position for receiving the ejected ink. The ink receptor is therefore normally disposed near the home position in the no-printing area 83. The drive confirmation process can therefore be structured to run simultaneously with the ink ejection operation. It should be noted that while the carriage 73 drive operation is the same for both processes, the drive state confirmation process must be performed parallel to print head drive control for ink ejection.

An example of the drive state confirmation process is described next with reference to FIG. 14, which is a state transition diagram for describing this drive state confirmation process.

Figure 14:
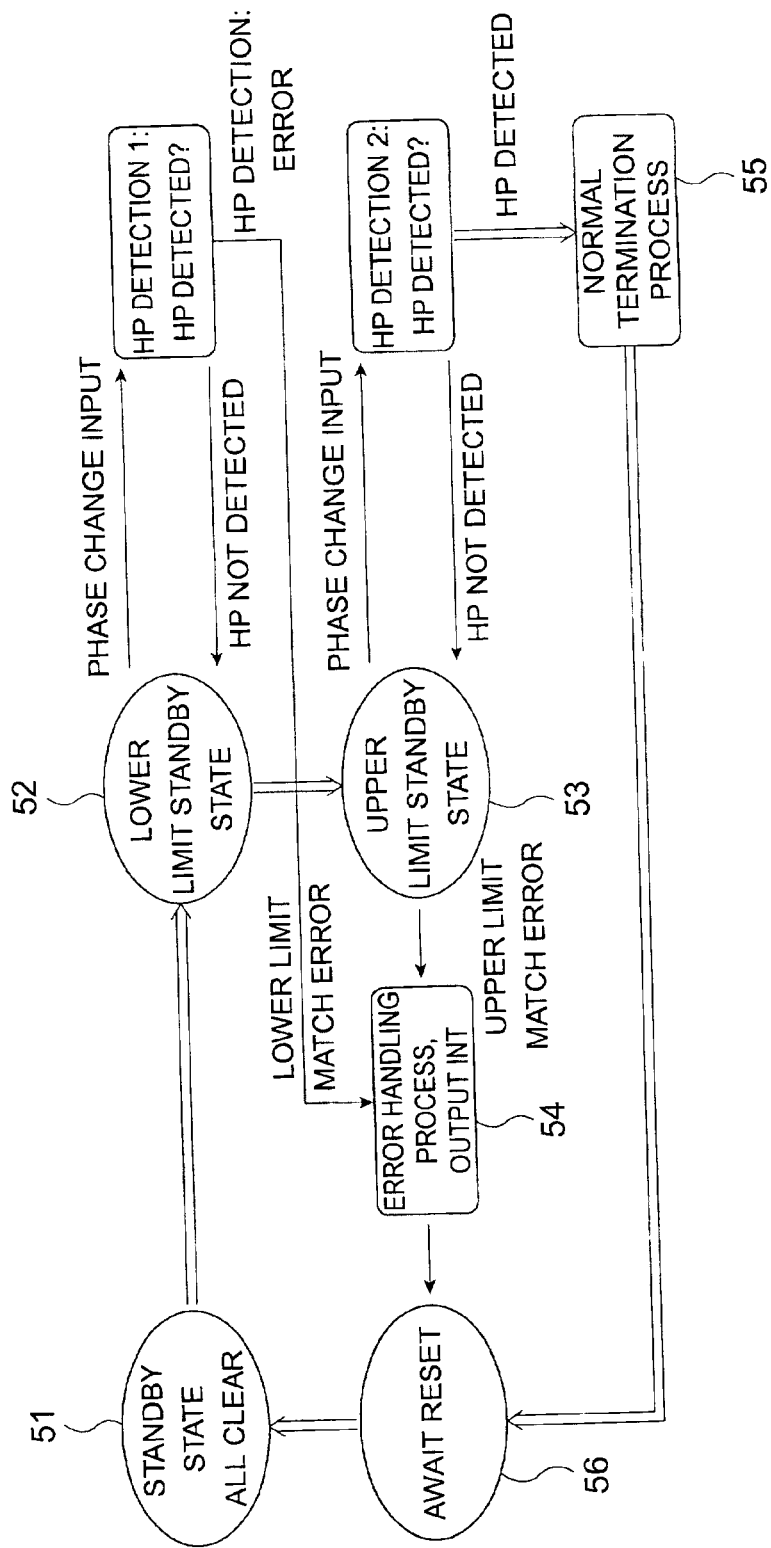
FIG. 14 is a state transition diagram showing various states in the drive confirmation process.

Typical carriage movement in conjunction with drive state confirmation is described briefly before describing the process in FIG. 14.

The carriage is first stopped at a second reference position (S in FIG. 13) in the standby mode. Control and timing data for the drive state confirmation operation is generated in this state and stored to memory. When the CPU then outputs a start drive signal to the DMA, the DMA reads the control data from memory and sends it to the timer and drive controller, respectively. Drive control of stepping motor 25 thus starts. When the motor is driven, carriage 73 moves gradually to the right from the second reference position S. When the carriage passes the home position, the home position sensor outputs a detection signal. The drive state is confirmed based on the detection signal from the home position sensor.

The drive state confirmation process is described next. All flags and counters, etc. are cleared in standby state 51, that is, when the drive state confirmation process is not running. To start the drive state confirmation process, CPU 1 generates timing data and control data in order to move the carriage 73 to the home position HP for the drive state confirmation process, and stores this data to tables 10 to 12a in memory 2. After this control data is stored to memory, CPU 1 activates phase change timing controller 21 of DMA 3 (see FIG. 12), and starts drive control of stepping motor 25 to move the carriage. The signal starting drive control simultaneously starts the drive state confirmation process and enters the lower limit standby state 52 shown in FIG. 14.

Whether the computed logical position of the carriage 73 has reached a computed lower limit allowed for the home position is checked in this lower limit standby state 52. If the HP detection signal is detected before the logical position of the carriage 73 reaches the lower limit, the actual carriage position is known to be to offset greatly to the right (as seen in FIG. 13) from the logical carriage position, and a drive error is determined to have occurred. Whether the home position HP is detected before the lower limit is reached is therefore determined (HP detection 1). A drive error is detected if the home position is detected before the carriage position reaches the lower limit position, and an interrupt signal is output to the CPU 1 for an error handling process (error handling process output INT state 54). If the home position is not detected in HP detection 1, lower limit standby state 52 continues.

If the lower limit position is reached with no HP detection signal having been detected, an upper limit standby state 53 is assumed. Whether the logical position of the carriage 73 has reached a computed upper limit position allowed for the home position is checked in this upper limit standby state 53. If the HP detection signal is not detected by the time the logical position of the carriage 73 reaches the upper limit, the actual carriage position is known to be to offset greatly to the left (as seen in FIG. 13) from the logical carriage position, and a drive error is determined to have occurred.

To detect this state, it is confirmed whether the home position is detected at each phase change time until the upper limit position is reached (HP detection 2). If the home position is not detected by the time the upper limit position is reached, an interrupt signal is output to the CPU 1 to activate the CPU 1 and run a specific error handling process (state 54). If an error interrupt is applied to the CPU 1, the CPU 1 indicates a drive error, runs an appropriate error handling process, and waits for recovery from the error (state 56).

If the home position is detected in HP detection state 2, the offset between the logical carriage position and the actual carriage position is known to be within an acceptable range, and a normal termination process 55 is run to normally terminate the drive state confirmation process. This normal termination process 55 can, for example, drive the carriage to the right end of the printing area 82 after home position HP detection and re-enable printing (state 56).

Figure 15:
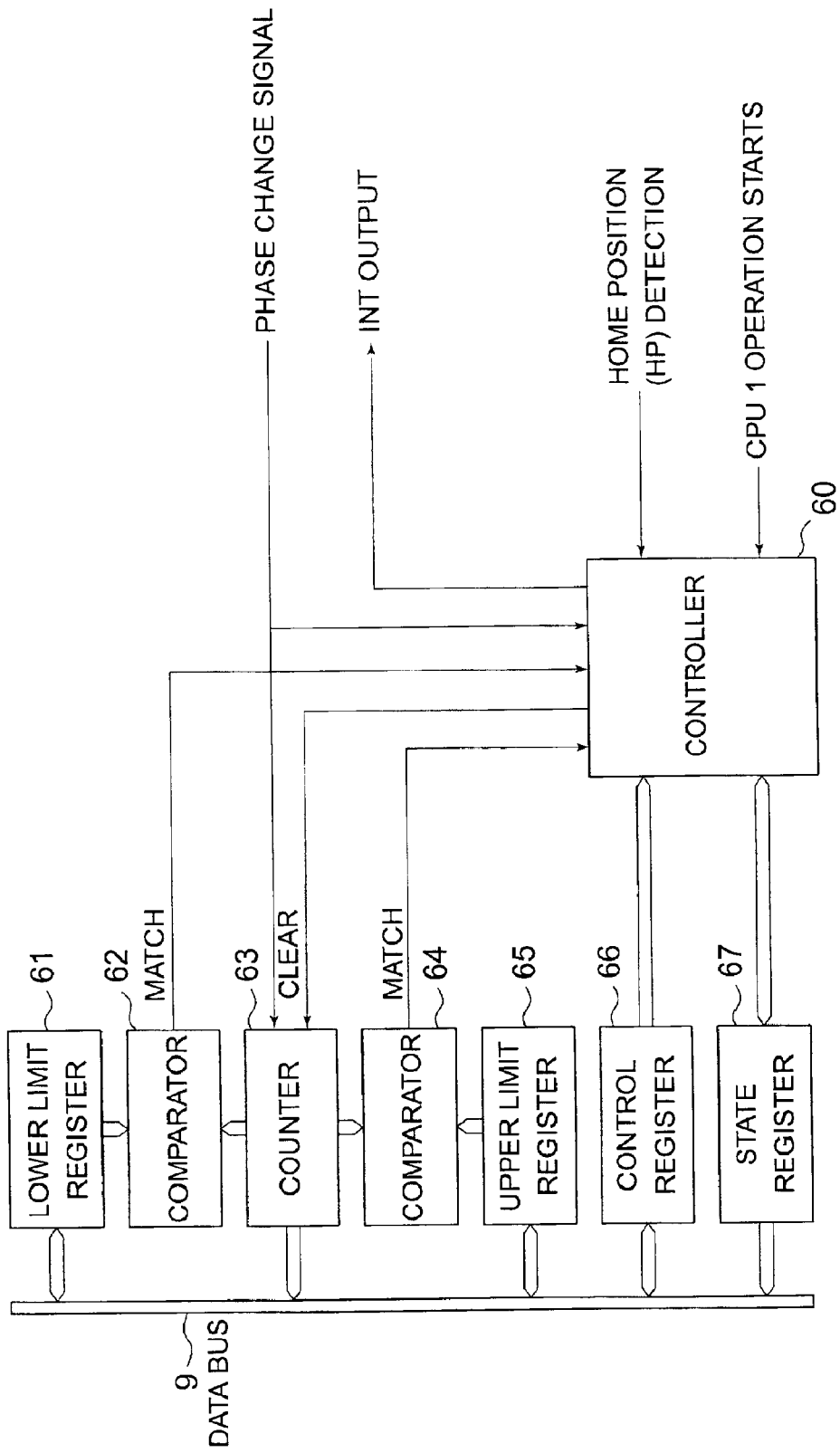
FIG. 15 shows an exemplary configuration of the drive confirmation unit of the present invention.

FIG. 15 is a functional block diagram of an exemplary drive confirmation unit 50 according to the present invention. The drive confirmation unit 50 has a lower limit register 61 for storing the allowable lower limit position computed as the home position HP, and an upper limit register drive 65 for storing a computed allowable upper limit position. The lower and upper limit position values are stored to lower limit register 61 and upper limit register 65, respectively, by CPU 1 via data bus 9. The drive confirmation unit 50 also comprises a counter 63, which counts up according to the phase change signal (time-up signal). The counter 63 is cleared by a signal from controller 60 before starting the drive state confirmation process. The incremented count of counter 63 is compared by comparators 62 and 64 with the values from lower limit register 61 and upper limit register 65, respectively. If the counter 63 value matches the value stored to lower limit register 61 or upper limit register 65, a match signal is output to the controller 60.

The controller 60 operates according to data stored in control register 66, and after the drive state confirmation process has been executed its state (the result) is stored to state register 67. Data from CPU 1 is written to control register 66, and CPU 1 can read from state register 67. CPU 1 can also read the current count from counter 63 via data bus 9. The match signal, phase change signal (time-up signal), home position signal HP, and others are input to controller 60, which detects drive errors based on the match signal output timing from comparator 64 and the timing at which home position signal HP is received.

Figure 16:
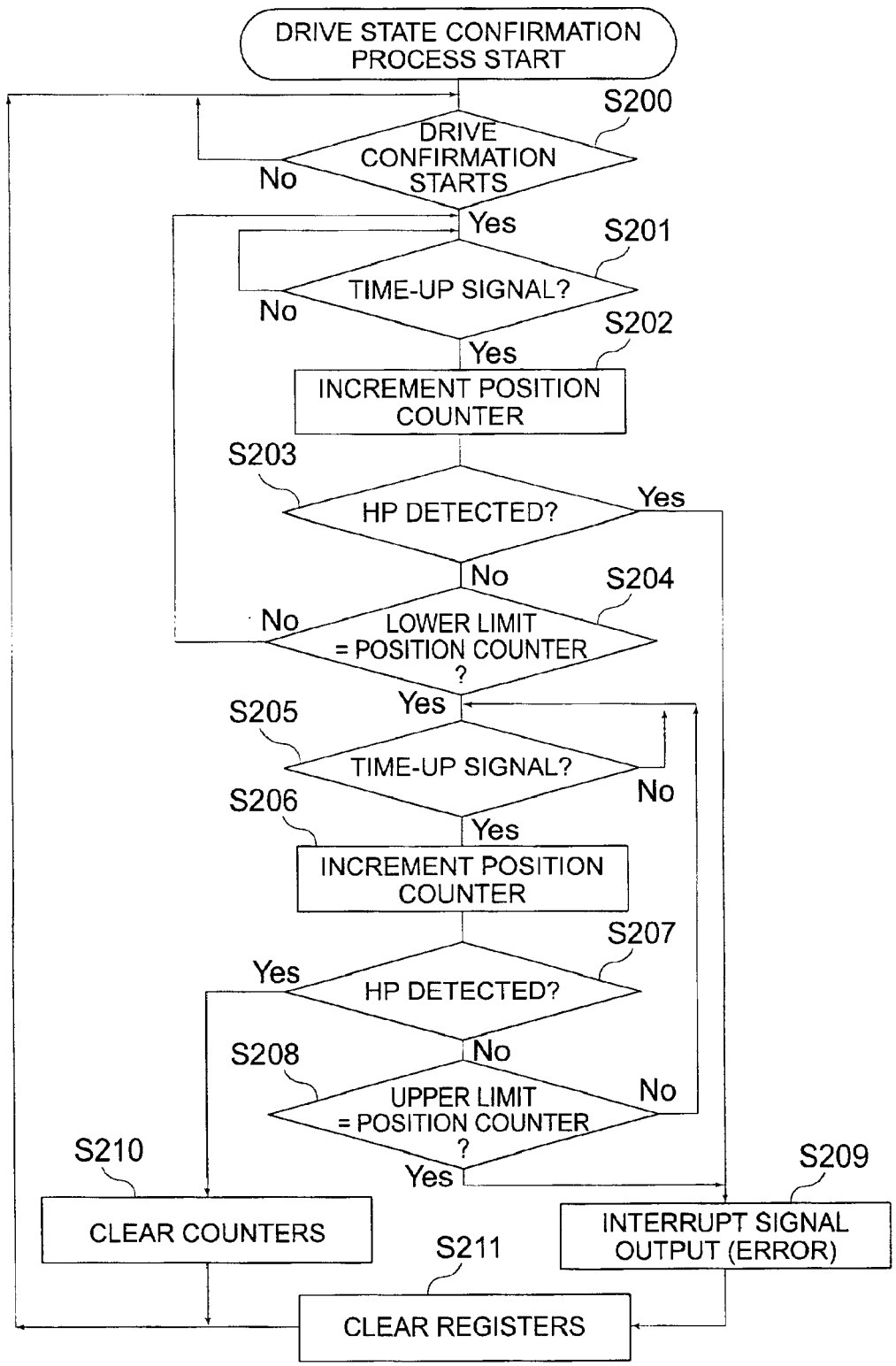
FIG. 16 is a flow chart showing the confirmation operation of a controller of a drive confirmation unit.

The operation of controller 60 is described next with reference to FIGS. 13, 15 and 16, the latter of which is a flow chart showing the drive state confirmation process of the controller 60 of drive confirmation unit 50. Assume that carriage 73 is initially stopped at position S in FIG. 13.

Before starting the drive state confirmation process, CPU 1 sets the motor drive control data to memory 2 as described above. At the same time CPU 1 also clears lower limit register 61, upper limit register 65, control register 66, and counter 63. The values set to upper limit register 65 and lower limit register 61 can be freely determined according to the desired degree of error detection precision. In this example the lower limit position is set to "1000" in lower limit register 61, and the upper limit position is set to "1020" in upper limit register 65.

When CPU 1 activates phase change timing controller 21 in DMA 3, it also activates drive confirmation unit 50 at the same time (S200). Based on timer data from phase change timing controller 21 (see FIG. 12), timer 4 outputs a time-up signal at each phase change timing. Based on the time-up signal, phase pattern controller 22 and phase current controller 23 send the phase pattern and phase current data to motor drive controller 24. The motor drive controller 24 then drives stepping motor 25 based on this control data, and carriage 73 begins moving toward home position.

Once drive confirmation unit 50 starts the drive state confirmation process, counter 63 increments each time timer 4 outputs the time-up signal (S201, S202). Whether HP detector 72 outputs a detection signal is then checked. If the HP detection signal is not output (S203 returns no), the values from counter 63 and lower limit register 61 are compared (S204). If the value of counter 63 has not reached the lower limit value (S204 returns no), the same process repeats (that is, steps S201, S202, S203, and S204).

Note that detection of the HP detection signal in S203 means that the carriage 73 has actually reached the home position even though the computed position of carriage 73 has not reached the lower limit setting of 1000. An error is therefore detected (S203 returns yes) and an interrupt signal is output to CPU 1 (S209). The registers 61, 65 are then cleared (S211) and a standby state assumed (S200). Note that the CPU 1 can reference the content of counter 63 and state register 67 by means of an interrupt error handling process.

When counter 63 increments to 1000, the value in lower limit register 61 and the counter 63 value match (S204 returns yes). The upper limit standby state 53 (see FIG. 14) is therefore assumed and the next time-up signal is awaited (S205 returns no). When a time-up signal is received (S205 returns yes), counter 63 increments (S206), and whether the HP detection signal is output is checked (S207). If the HP detection signal is not output (S207 returns no), the value in upper limit register 65 is compared with the counter 63 value (S208). If they are not the same (S208 returns no), the same process steps are repeated (that is, S205, S206, S207, S208). If the HP detection signal is detected (S207 returns yes), carriage 73 has reached the actual home position within the range: lower limit 1000<counter value<upper limit 1020. The logical and actual carriage 73 positions are thus within a specific tolerance range, drive is determined to be normal, counter 63 and register 65 are cleared (S210), and standby state 51 (see FIG. 14) is assumed. If the counter reaches 1020, the value set to upper limit register 65 and the counter 63 match (S208 returns yes). This means that even though the carriage should have moved to the logical upper limit position 1020, it has not actually reached the home position. A drive error is therefore detected.

If an error is determined after the home position is detected, an interrupt can be issued to the CPU 1, which then stops driving stepping motor 25, or stepping motor 25 can be driven to a specific position to enable error recovery. To terminate the process normally, the timing and control data generated and stored to memory 2 for the drive state confirmation process can include control data for returning the carriage to a specific position (such as the second reference position S in FIG. 13) if the step count (identical to the count tracked by counter 63) exceeds the upper limit 1020 or 1021.

The relationship between drive control of carriage 73 (drive control of stepping motor 25) and the drive confirmation unit is described next with reference to FIGS. 17 and 12.

Figure 17:
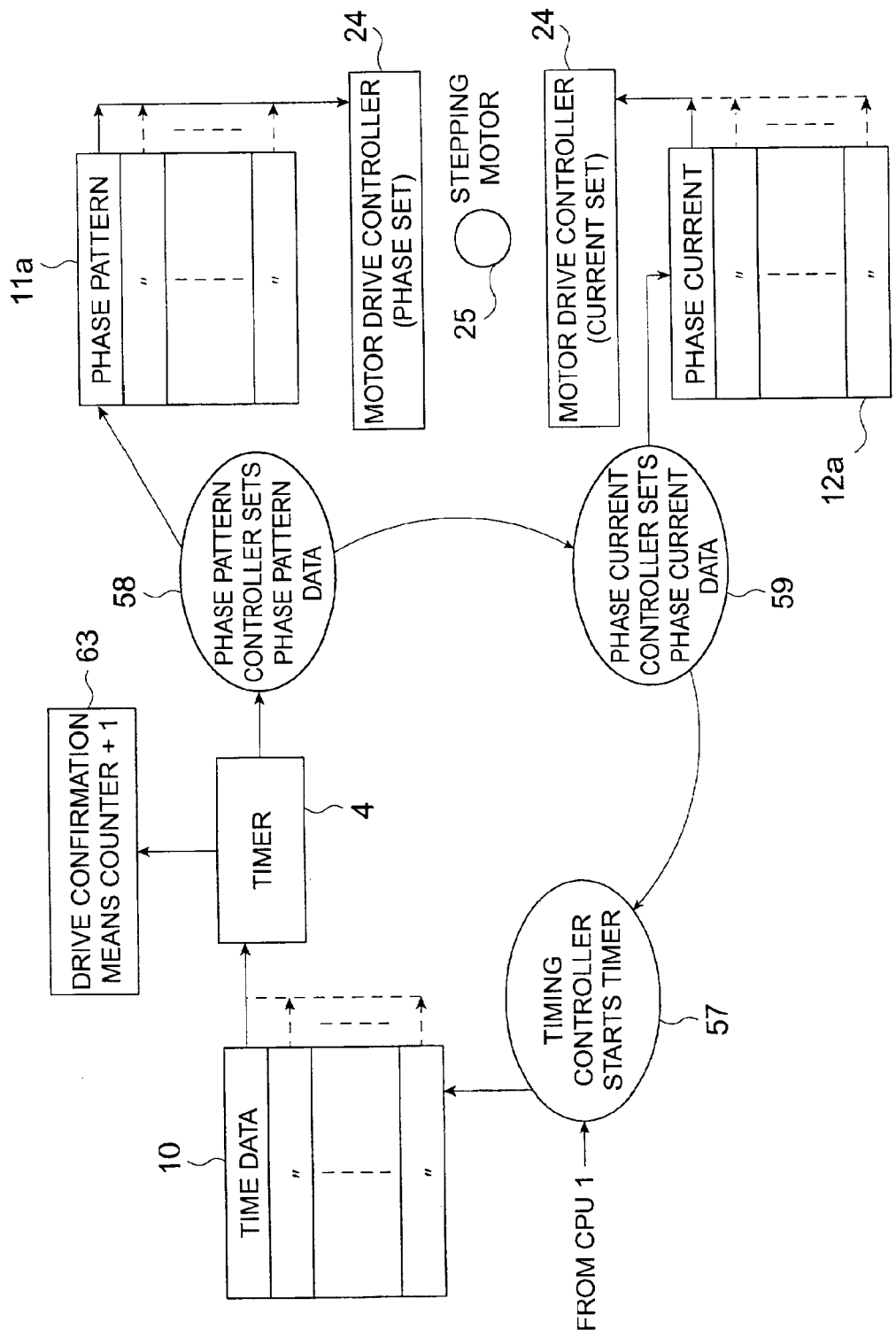
FIG. 17 is a state transition diagram showing the relationship between a continuous control operation from the start motor drive request to setting the change timing data, phase pattern data, and phase current data to setting the next change timing, and the drive confirmation process of this control operation.
Figure 18:
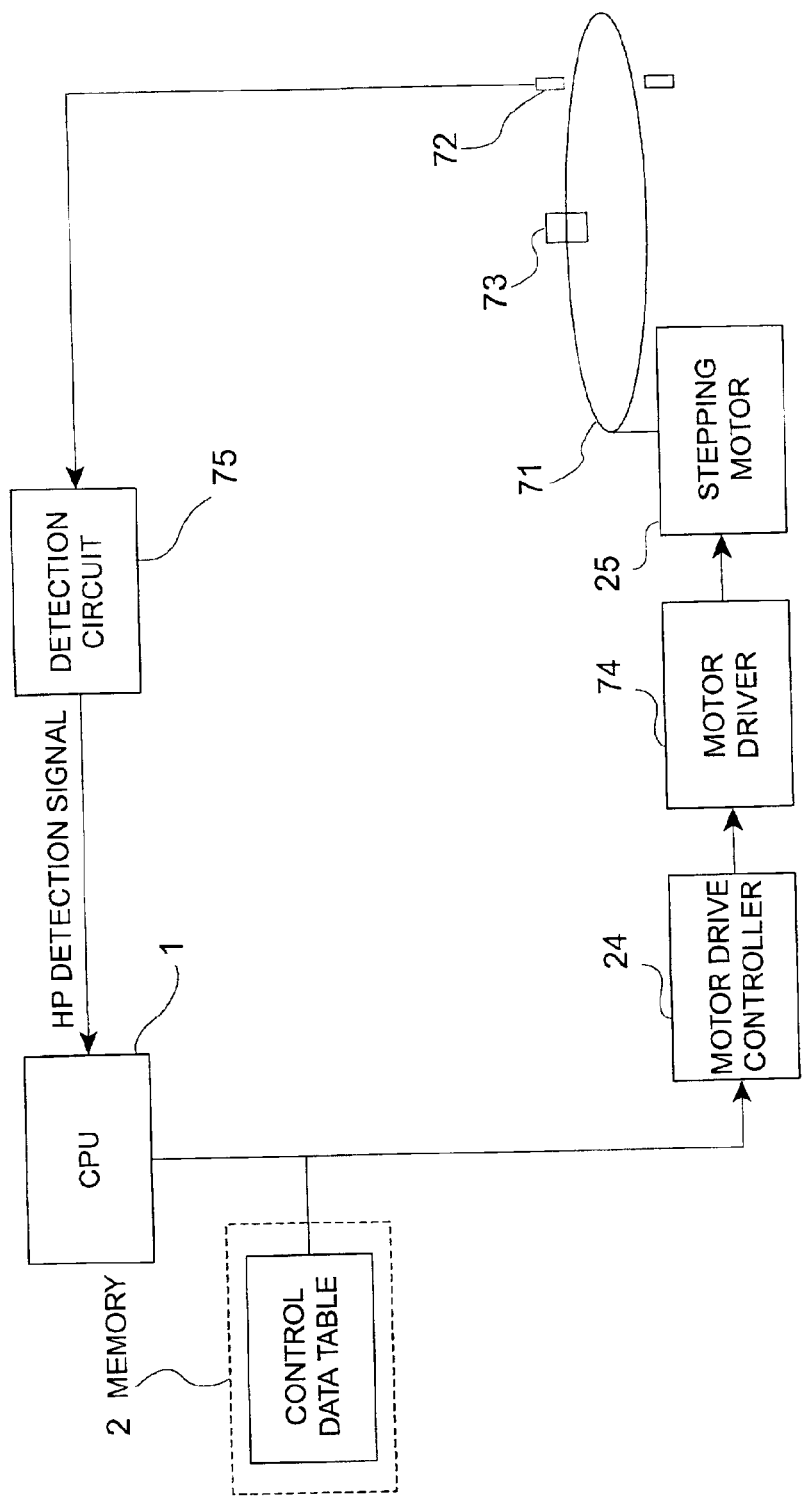
FIG. 18 is a block diagram describing a conventional drive confirmation process using a CPU.

FIG. 17 shows the state transitions of the continuous control loop starting from receiving the start motor drive request to setting the change timing data, phase pattern data, phase current data, and then setting the next change timing data, and the relationship of the drive state confirmation process to this operation.

When the start of drive control for the drive state confirmation process is indicated by CPU 1, the first timing data in timing data table 10 is read and sent to timer 4. The timer 4 monitors passage of the specific time interval based on the received timing data (state 1: 57).

When timer 4 detects passage of the specific time, it outputs a time-up signal. Based thereon, phase pattern controller 22 reads the first phase pattern data from phase pattern data table 11a, and sets the phase to motor drive controller 24 (state 2: 58). Drive confirmation unit 50 also increments counter 63 of drive confirmation unit 50 at the same time based on the time-up signal.

When sending the first phase pattern data ends, phase current controller 23 reads the first phase current data from phase current table 12a, and sets the phase current to motor drive controller 24. Stepping motor 25 drive starts when this is completed (state 3: 59).

When sending the phase current ends, phase change timing controller 21 is driven again to read and send the next timing data from phase change timing controller 21 to timer 4 (state 1: 57). Motor 25 based on the first phase pattern and phase current then proceeds until the timer 4 outputs a time-up signal based on the second timing data.

When timer 4 detects the specific time has passed, it outputs a time-up signal. Based thereon, phase pattern controller 22 reads the next (second) phase pattern data and sets the phase of motor drive controller 24 (state 2: 58). Drive confirmation unit 50 also increments counter 63 at the same time based on the time-up signal. The next (second) phase current is then set by phase current controller 23 (state 3: 59). The stepping motor 25 is thus driven based on the second phase pattern and phase current until the next (third) time-up signal is output.

As will be understood from the above, the first timing data is a dummy value for setting the first phase pattern and phase current. The stepping motor 25 is driven at the first set phase pattern and phase current until the time specified by the second timing data (time data) passes and the phase pattern changes. Likewise, the stepping motor 25 is next driven until the next phase change timing according to the next phase pattern and phase current settings.

The drive of motor 25 thus starts from the second phase change timing as shown in FIG. 6(A), and motor drive is controlled according to specific change timing data and control data. During this time the counter 63 of drive confirmation unit 50 is incremented each time the time-up signal is output, and the counter is compared with lower limit register 61 and upper limit register 65.

It should be noted that the above described drive confirmation operation is controlled by a program stored in memory. In a printer, for example, a home position sensor is normally disposed at a location separated from the printing area, and the carriage is driven so that it is detected by the home position sensor at least once every unit time to confirm carriage operation. The frequency of this drive state confirmation process can be freely determined by the designer when writing the drive control program. For example, by regularly performing this operation at a specific interval, the timing of the confirmation process can also be changed according to actual drive mechanism operation.

Furthermore, when the first reference position is set to a home position removed from the printing area, an error can be immediately detected if the home position is detected while printing is in progress. However, it will also be obvious that the first reference position is not necessarily set outside the printing area. A first reference position can be set inside the printing area with a sensor disposed thereto so that the drive state confirmation process can be accomplished while printing.

Moreover, plural position sensors can also be provided. For example, the position sensors could be disposed on both sides of the path of movement, more than one could be disposed in the printing area, or sensors could be disposed both on the sides of the path of movement and in the printing area. Providing plural position sensors enables even more detailed, precise confirmation of drive control, and can further improve reliability.

Furthermore, a dummy ink ejection operation is performed at a regular frequency in an ink jet printer to ensure normal printing. Therefore, by disposing a receptacle for the ink ejected by this dummy operation near the home position, carriage drive for the dummy ink ejection operation can also be used for the drive state confirmation process.

It should be noted that the above drive state confirmation process is described with reference to a print head carriage drive mechanism for a printer, but the invention is not so limited. For example, the concept of the present invention can be applied to virtually any field requiring precision drive mechanism control, including a printing paper transport mechanism, currency transport mechanism in an ATM, and a magnetic head or other type of head drive mechanism. It will be apparent that the location of the first and second reference positions will be appropriately determined based on knowledge and practice in the applicable field.

Moreover, the preceding embodiments have been described with reference to a stepping motor drive mechanism and print head drive mechanism. As noted above, however, the invention is not so limited, since the invention can also be applied to drive mechanisms using a linear motor, drive mechanisms using ultrasonic oscillators, drive mechanisms using electromagnets, drive mechanisms using a combination of these, and all other types of drive mechanisms to which the technical concept of the invention can be applied. Furthermore, control data specific to these drive mechanisms can be supplied at timing specific to the drive mechanism using the DMA control of the present invention so that once driving starts drive mechanism control can continue without involving the CPU.

As described above, timing data and specific control data is stored to memory in advance of drive mechanism control in the present invention, and DMA is used to set the timing data to a timer and the control data to the drive mechanism. As a result, the present invention enables high precision control of motor drive without using CPU interrupts and without using expensive dedicated hardware.

While the invention has been described in conjunction with several specific embodiments, further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A drive mechanism control apparatus, comprising:
    a driver;
    a drive controller in communication with the driver;
    a data generator for generating control data for controlling the driver, and for generating timing data for controlling output timing of the control data to the drive controller, wherein the drive controller controls operation of the driver based on the transmitted control data;
    a storage medium for storing the timing data and control data;
    a timer for starting a timing operation upon receipt of timing data, and for outputting a time-up signal when a time specified by the received timing data elapses;
    a first direct memory access for reading the timing data from the storage medium, and for sending the read timing data to the timer when activated by a specific signal; and
    a second direct memory access for reading control data from the storage medium, and for sending the read control data to the drive controller when the time-up signal is received from the timer;
    wherein the second direct memory access is configured to output to the first direct memory access a start signal to cause the first direct memory access to start reading second timing data after the second direct memory access completes the sending of control data corresponding to first timing data to the drive controller.

2. A drive mechanism control apparatus as recited in claim 1, wherein
    the data generator is configured to generate plural timing data; and plural control data corresponding to the plural timing data; and
    the first direct memory access is configured to read the second timing data from the storage medium and send the second timing data to the timer based on the start signal.

3. A drive mechanism control apparatus as recited in claim 2, wherein the second direct memory access further comprises:
    a first control unit, activated by the time-up signal from the timer, for reading, from among plural control data stored to the storage medium, first control data corresponding to the first timing data each time the time-up signal is received, and for sending the read first control data to the drive controller; and
    a second control unit, activated by completion of sending the first control data, for reading, from among the plural control data stored to the storage medium, second control data corresponding to the second timing data, for sending the read second control data to the drive controller, and then for outputting the start signal to the first direct memory access.

4. A drive mechanism control apparatus as recited in claim 1, further comprising:
    a stepping motor;
    wherein the timing data comprises timing data for controlling a phase change timing of the motor, and the control data comprises phase pattern data that is set when the motor phase changes and phase current data for controlling current supplied to the motor when the motor phase changes.

5. A drive mechanism control apparatus as recited in claim 4, wherein the data generator generates basic timing data, phase pattern data, and phase current data for use during motor acceleration, deceleration, and constant speed operation, and generates the timing data, first control data, and second control data based on the basic timing data.

6. A drive mechanism control apparatus as recited in claim 1, further comprising:
    a head drive;
    wherein the timing data and control data comprises data controlling head drive timing, drive trigger data for actually driving the head, and print data.

7. A drive mechanism control apparatus, comprising:

a driver;

a drive controller in communication with the driver;

a data generator for generating control data for controlling the driver, and for generating timing data for controlling output timing of the control data to the drive controller, wherein the drive controller controls operation of the driver based on the transmitted control data;

a storage medium for storing the timing data and control data;

a timer for starting a timing operation upon receipt of timing data, and for outputting a time-up signal when a time specified by that timing data elapses;

a direct memory access for sequentially reading timing data from the storage medium, and for sequentially sending the read timing data to the timer when activated by a specific signal, and then for sending corresponding control data from the storage medium to the drive controller based on the time-up signal output from the timer, wherein the direct memory access is configured to output a start signal to start the reading of next timing data after completing the sending of control data corresponding to previous timing data to the drive controller;

a position detector for outputting a position detection signal when an operating part of the drive mechanism reaches a first reference position; and a drive confirmation unit for computing a logical operating position of the drive mechanism from the sent control data, for confirming drive mechanism operating status by comparing the logical operating position with the actual operating position based on the position detection signal, and for outputting an operating error signal when a drive operation error is detected.

8. A drive mechanism control apparatus as recited in claim 7, wherein the drive confirmation unit comprises:

a comparison data storage unit in which specific count values are stored;

a counter that is initialized when the operating part is at a second reference position and counts each time the time-up signal is received; and a comparator for comparing the value of the counter with a specific count value stored in the comparison data storage unit;

wherein the operating status of the drive mechanism is confirmed according to the comparison result of the comparator when the position detection signal is received.

9. A drive mechanism control apparatus as recited in claim 8, wherein the comparison data storage unit comprises:

a first comparison data storage unit for storing an allowable lower limit of a specific count value for measuring movement of the operating part from the second reference position to the first reference position; and a second comparison data storage unit for storing an allowable upper limit of the specific count value for measuring movement of the operating part from the second reference position to the first reference position;

wherein the drive confirmation unit outputs the operating error signal if the position detection signal is received when the value of the counter is less than or equal to the allowable lower limit or greater than or equal to the allowable upper limit.

10. A drive mechanism control apparatus as recited in claim 9, wherein the drive confirmation unit outputs the operating error signal as an interrupt signal to the data generator, and the data generator performs an error handling process corresponding to the operating error based on the interrupt signal.

11. A drive mechanism control apparatus as recited in claim 7, wherein a stop drive signal for stopping drive mechanism operation is output based on the operating error signal from the drive confirmation unit.

12. A drive mechanism control apparatus as recited in claim 7, further comprising:

a stepping motor;

wherein the timing data includes data for activating the change timing for the stepping motor phase change, a phase pattern for each change timing, and a supply current value for each change timing.

13. A drive mechanism control apparatus as recited in claim 12, further comprising a carriage driven by the stepping motor.

14. A drive mechanism control apparatus as recited in claim 7, further comprising:

a carriage for an ink jet print head;

wherein the drive confirmation unit performs the drive confirmation process when the carriage is driven to accomplish an ink jet head cleaning operation.

15. A drive mechanism control method, comprising steps for:

(a) generating and storing plural types of control data for controlling a driver and plural timing data for sequentially transmitting the plural control data one at a time;

(b) reading first timing data of the plural timing data;

(c) starting a timing operation when the read first timing data is received, and outputting a time-up signal when a time specified by the first timing data elapses;

(d) reading one control data type based on the time-up signal, and sending that control data type to a drive mechanism controller;

(e) outputting a start signal after the one control data tune is completely sent to the drive mechanism controller;

(f) reading next timing data of the plural timing data in response to the start signal and repeating steps (c), (d) and (e) for next timing data, another control data type, and another time-up signal; and (g) repeating step (f) until all of the stored plural timing data has been read.

16. A drive mechanism control method as recited in claim 15, wherein step (d) comprises:

(d1) sequentially and individually reading each type of control data from a first control data type to a last control data type according to the corresponding time-up signal, and sending each read control data type to the controller.

17. A drive mechanism control method as recited in claim 15, wherein the plural timing data comprises phase change timing data for changing the phase of a stepping motor, and one type of control data comprises phase pattern data that is applied to the stepping motor at each phase change and phase current data for controlling current supplied to the motor when the motor phase changes.

18. A drive mechanism control method as recited in claim 15, wherein the plural timing data comprises head drive timing data for controlling the timing of a head drive, and one type of control data comprises head drive trigger data and print data.

19. A drive operation confirmation method for a drive mechanism, comprising steps for:

(a) generating and storing plural control data for accomplishing a specific confirmation drive process and plural timing data controlling the timing of transmission of the plural control data;

(b) driving the drive mechanism by sequentially reading the plural timing data, and sequentially reading and transmitting the plural control data at specific timing intervals, based on the read timing data, to a drive mechanism controller, wherein a start signal is output to start the reading of next timing data after completing the sending of control data corresponding to previous timing data to the drive mechanism controller;

(c) calculating a drive amount of the drive mechanism based on the read and transmitted plural timing data and plural control data;

(d) calculating a difference between an actual operating position and a calculated operating position of an operating part of the drive mechanism, based on a position determined from the calculated drive amount and a position determined from a position detection signal; and (e) outputting an operating error signal when the difference between the calculated operating position and the actual operating position is outside a specific range.

20. A drive operation confirmation method as recited in claim 19, wherein step (c) comprises counting transmissions of control data sent at the specific timing intervals in step (b).

21. A drive operation confirmation method as recited in claim 19, wherein step (e) comprises outputting a stop signal stopping drive mechanism operation when the difference between the calculated operating position and the actual operating position is outside the specific range.

22. A drive operation confirmation method as recited in claim 19, wherein the plural timing data comprises timing data for changing a stepping motor phase pattern and change timing control data for changing the current control data, and the plural control data comprises phase pattern data for each changing timing, and current control data supplied at each change timing.

23. A machine-readable storage medium for storing a computer program for directing a machine to perform a drive mechanism control method, the computer program comprising:

(a) instructions for generating and storing plural types of control data for controlling a driver and plural timing data for sequentially transmitting the plural control data one at a time;

(b) instructions for reading first timing data of the plural timing data;

(c) instructions for starting a timing operation when the read first timing data is received, and outputting a time-up signal when a time specified by the first timing data elapses;

(d) instructions for reading one control data type based on the time-up signal, and sending that control data type to a drive mechanism controller;

(e) instructions for outputting a start signal after the one control data type is completely sent to drive mechanism controller;

(f) instructions for reading next timing data of the plural timing data in response to the start signal, and repeating (c), (d) and (e) for next timing data, another control data type, and another time-up signal; and (g) instructions for repeating (f) until all of the stored plural timing data has been read.

24. A machine-readable storage medium as recited in claim 23, wherein (d) comprises:

(d1) instructions for sequentially and individually reading each type of control data from a first control data type to a last control data type according to the corresponding time-up signal, and sending each read control data type to the controller.

25. A machine-readable storage medium as recited in claim 23, wherein the plural timing data comprises phase change timing data for changing the phase of a stepping motor, and one type of control data comprises phase pattern data that is applied to the stepping motor at each phase change and phase current data for controlling current supplied to the motor when the motor phase changes.

26. A machine-readable storage medium as recited in claim 23, wherein the plural timing data comprises head drive timing data for controlling the timing of a head drive, and one type of control data comprises head drive trigger data and print data.

27. A machine-readable storage medium as recited in claim 23, wherein the storage medium comprises a compact disc, floppy disc, hard disk, magnetically recordable tape, or electromagnetic signal.

28. A machine-readable storage medium for storing a computer program for directing a machine to perform a drive operation confirmation method for a drive mechanism, the computer program comprising:

(a) instructions for generating and storing plural control data for accomplishing a specific confirmation drive process and plural timing data controlling the timing of transmission of the plural control data;

(b) instructions for driving the drive mechanism by sequentially reading the plural timing data, and sequentially reading and transmitting the plural control data at specific timing intervals, based on the read timing data, to a drive mechanism controller, the driving instructions further including instructions for outputting a start signal to start the reading of next timing data after completing the sending of control data corresponding to previous timing data to the drive mechanism controller;

(c) instructions for calculating a drive amount of the drive mechanism based on the read and transmitted plural timing data and plural control data;

(d) instructions for calculating a difference between an actual operating position and a calculated operating position of an operating part of the drive mechanism, based on a position determined from the calculated drive amount and a position determined from a position detection signal; and (e) instructions for outputting an operating error signal when the difference between the calculated operating position and the actual operating position is outside a specific range.

29. A machine-readable storage medium as recited in claim 28, wherein (c) comprises counting transmissions of control data sent at the specific timing intervals in (b).

30. A machine-readable storage medium as recited in claim 28, wherein (e) comprises outputting a stop signal stopping drive mechanism operation when the difference between the calculated operating position and the actual operating position is outside the specific range.

31. A machine-readable storage medium as recited in claim 28, wherein the plural timing data comprises timing data for changing a stepping motor phase pattern and change timing control data for changing the current control data, and the plural control data comprises phase pattern data for each changing timing, and current control data supplied at each change timing.

32. A machine-readable storage medium as recited in claim 28, wherein the storage medium comprises a compact disc, floppy disc, hard disk, magnetically recordable tape, or electromagnetic signal.

33. A drive mechanism control apparatus, comprising:
driving means;
means for controlling the driving means;
means for generating control data for controlling the driving means, and for generating timing data for controlling output timing of the control data to the driving controlling means, wherein the driving controlling means controls operation of the driving means based on the transmitted control data;
means for storing the timing data and control data;
means for starting a timing operation upon receipt of timing data, and for outputting a time-up signal when a time specified by the received timing data elapses;
first direct memory access means for reading the timing data from the storing means, and for sending the read timing data to the timer when activated by a specific signal; and
second direct memory access means for reading control data from the storing means, and for sending the read control data to the driving controlling means when the time-up signal is received from the timing means;
wherein the second direct memory access means is configured to output to the first direct memory access means a start signal to cause the first direct memory access means to start reading second timing data after the second direct memory access means completes the sending of control data corresponding to first timing data to the controlling means.

34. A drive mechanism control apparatus as recited in claim 33, wherein
the data generating means is configured to generate plural timing data and plural control data corresponding to the plural timing data; and
the first direct memory access means is configured to read the second timing data from the storing means and send the second timing data to the timing means based on the start signal.

35. A drive mechanism control apparatus as recited in claim 34, wherein the second direct memory access means further comprises:
first control means, activated by the time-up signal from the timing means, for reading, from among plural control data stored to the storing means, first control data corresponding to the first timing data each time the time-up signal is received, and for sending the read first control data to the driving controlling means; and
second control means, activated by completion of sending the first control data, for reading, from among the plural control data stored to the storing means, second control data corresponding to the second timing data, for sending the read second control data to the driving controlling means, and then for outputting the start signal to the first direct memory access means.

36. A drive mechanism control apparatus as recited in claim 33, further comprising:
means for imparting motion in a stepping manner;
wherein the timing data comprises timing data for controlling a phase change timing of the motion imparting means, and the control data comprises phase pattern data that is set when the phase of the motion imparting means changes and phase current data for controlling current supplied to the motion imparting means when the phase of the motion imparting means changes.

37. A drive mechanism control apparatus as recited in claim 36, wherein the data generator generates basic timing data, phase pattern data, and phase current data for use during motion imparting means acceleration, deceleration, and constant speed operation, and generates the timing data, first control data, and second control data based on the basic timing data.

38. A drive mechanism control apparatus as recited in claim 33, further comprising:
means for driving a head;
wherein the timing data and control data comprises data controlling head drive timing, drive trigger data for actually driving the head, and print data.

39. A drive mechanism control apparatus, comprising:
driving means;
means for controlling the driving means;
means for generating control data for controlling the driver, and for generating timing data for controlling output timing of the control data to the driving controlling means, wherein the driving controlling means controls operation of the driving means based on the transmitted control data;
means for storing the timing data and control data;
means for starting a timing operation upon receipt of timing data, and for outputting a time-up signal when a time specified by that timing data elapses;
direct memory access means for sequentially reading timing data from the storing means, and for sequentially sending the read timing data to the timing means when activated by a specific signal, and then for sending corresponding control data from the storing means to the driving controlling based on the time-up signal output from the timing means, wherein the direct memory access means is configured to output a start signal to start reading of next timing data after completing the sending of control data corresponding to previous timing data to the drive controller;
means for outputting a position detection signal when an operating part of the drive mechanism reaches a first reference position; and
drive confirmation means for computing a logical operating position of the drive mechanism from the sent control data, for confirming drive mechanism operating status by comparing the logical operating position with the actual operating position based on the position detection signal, and for outputting an operating error signal when a drive operation error is detected.

40. A drive mechanism control apparatus as recited in claim 39, wherein the drive confirmation means comprises:
comparison data storing means in which specific count values are stored;
counting means that is initialized when the operating part is at a second reference position and counts each time the time-up signal is received; and
means for comparing the value of the counting means with a specific count value stored in the comparison data storing means;
wherein the operating status of the drive mechanism is confirmed according to the comparison result of the comparing means when the position detection signal is received.

41. A drive mechanism control apparatus as recited in claim 40, wherein the comparison data storing means comprises:

first comparison data storing means for storing an allowable lower limit of a specific count value for measuring movement of the operating part from the second reference position to the first reference position; and second comparison data storing means for storing an allowable upper limit of the specific count value for measuring movement of the operating part from the second reference position to the first reference position;

wherein the drive confirmation means outputs the operating error signal if the position detection signal is received when the value of the counting means is less than or equal to the allowable lower limit or greater than or equal to the allowable upper limit.

42. A drive mechanism control apparatus as recited in claim 41, wherein the drive confirmation means outputs the operating error signal as an interrupt signal to the data generating means, and the data generating means performs an error handling process corresponding to the operating error based on the interrupt signal.

43. A drive mechanism control apparatus as recited in claim 39, wherein a stop drive signal for stopping drive mechanism operation is output based on the operating error signal from the drive confirmation means.

44. A drive mechanism control apparatus as recited in claim 39, further comprising:

means for imparting motion in a stepping manner;

wherein the timing data includes data for activating the change timing for the phase change of the motion imparting means, a phase pattern for each change timing, and a supply current value for each change timing.

45. A drive mechanism control apparatus as recited in claim 44, further comprising means driven by the motion imparting means.

46. A drive mechanism control apparatus as recited in claim 39, further comprising:

driven means for an ink jet print head;

wherein the drive confirmation means performs the drive confirmation process when the driven means is driven to accomplish an ink jet head cleaning operation.

* * * * *

UNITED STATES PATENT AND TRADEMARK OFFICE
CERTIFICATE OF CORRECTION

PATENT NO. : 6,848,061 B2
DATED : January 25, 2005
INVENTOR(S) : Yuji Kawase

It is certified that error appears in the above-identified patent and that said Letters Patent is hereby corrected as shown below:

Column 22,
Line 25, after "data" (first occurrence), delete ";"

Column 24,
Line 37, after "data" delete "tune" and insert -- type -- therefor

Signed and Sealed this

Twenty-fourth Day of May, 2005

JON W. DUDAS
*Director of the United States Patent and Trademark Office*